United States Patent
Pinkerton

(10) Patent No.: US 6,236,123 B1
(45) Date of Patent: *May 22, 2001

(54) GENERATOR PROVIDING ALTERNATING CURRENT WHICH HAS A SELECTED FREQUENCY

(75) Inventor: Joseph F. Pinkerton, Austin, TX (US)

(73) Assignee: Active Power, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/252,673

(22) Filed: Feb. 19, 1999

Related U.S. Application Data

(63) Continuation-in-part of application No. 08/925,078, filed on Sep. 9, 1997, now Pat. No. 5,874,797, which is a continuation of application No. 08/762,991, filed on Dec. 10, 1996, now abandoned.

(51) Int. Cl.[7] ................................................... H02K 41/00
(52) U.S. Cl. .............................. 310/12; 310/13; 310/112; 310/113; 310/114; 310/156; 322/10; 322/51
(58) Field of Search ............................ 310/31, 112–114, 310/156; 322/10, 51

(56) References Cited

U.S. PATENT DOCUMENTS

| | | |
|---|---|---|
| 2,784,332 | 3/1957 | Kober . |
| 2,842,275 | 2/1958 | Kober . |
| 3,077,548 | 2/1963 | Moressee et al. . |
| 3,233,133 | 2/1966 | Kober . |
| 3,315,106 | 4/1967 | Reynst . |
| 3,405,296 | 10/1968 | Stilley et al. . |
| 3,713,015 | 1/1973 | Frister . |
| 4,305,031 | 12/1981 | Wharton . |
| 4,371,801 | 2/1983 | Richter . |
| 4,578,609 | 3/1986 | McCarty . |
| 4,654,577 | 3/1987 | Howard . |
| 4,663,581 | 5/1987 | Glennon . |
| 4,882,513 | 11/1989 | Flygare et al. . |
| 5,033,265 | 7/1991 | Sugden . |
| 5,245,238 | 9/1993 | Lynch et al. . |
| 5,260,642 | 11/1993 | Huss . |
| 5,300,848 | 4/1994 | Huss et al. . |
| 5,753,990 | * 5/1998 | Flynn et al. .......................... 310/156 |
| 5,892,307 | * 4/1999 | Pavlovich et al. ................. 310/68 B |

* cited by examiner

Primary Examiner—Elvin Enad
(74) Attorney, Agent, or Firm—Fish & Neave; Roberts W. Morris

(57) ABSTRACT

An electrical generator has at least one rotating ring of field magnets which produce a circular array of magnetic fields, and a ring of generator output coils which are in the magnetic fields. The field magnets are permanent magnets or electromagnets. The generator output coils are movable in a displacement path toward and away from a null position at which they are exposed to zero net flux from the magnetic fields. Movement of the coils by an actuator varies the amplitude of the voltage induced in these coils by the rotating field magnets. The actuator is energized by an alternating current to create a mechanical oscillation of the generator output coils in their displacement path. The coils provide a raw amplitude-modulated signal that has a carrier frequency which is a function of the rotational velocity of the field magnets and a modulation frequency that is proportional to the mechanical oscillation of the generator output coils. The raw output signal is fed to a signal processor which converts it to a final output signal, the frequency of which is equal to the modulation frequency.

58 Claims, 38 Drawing Sheets

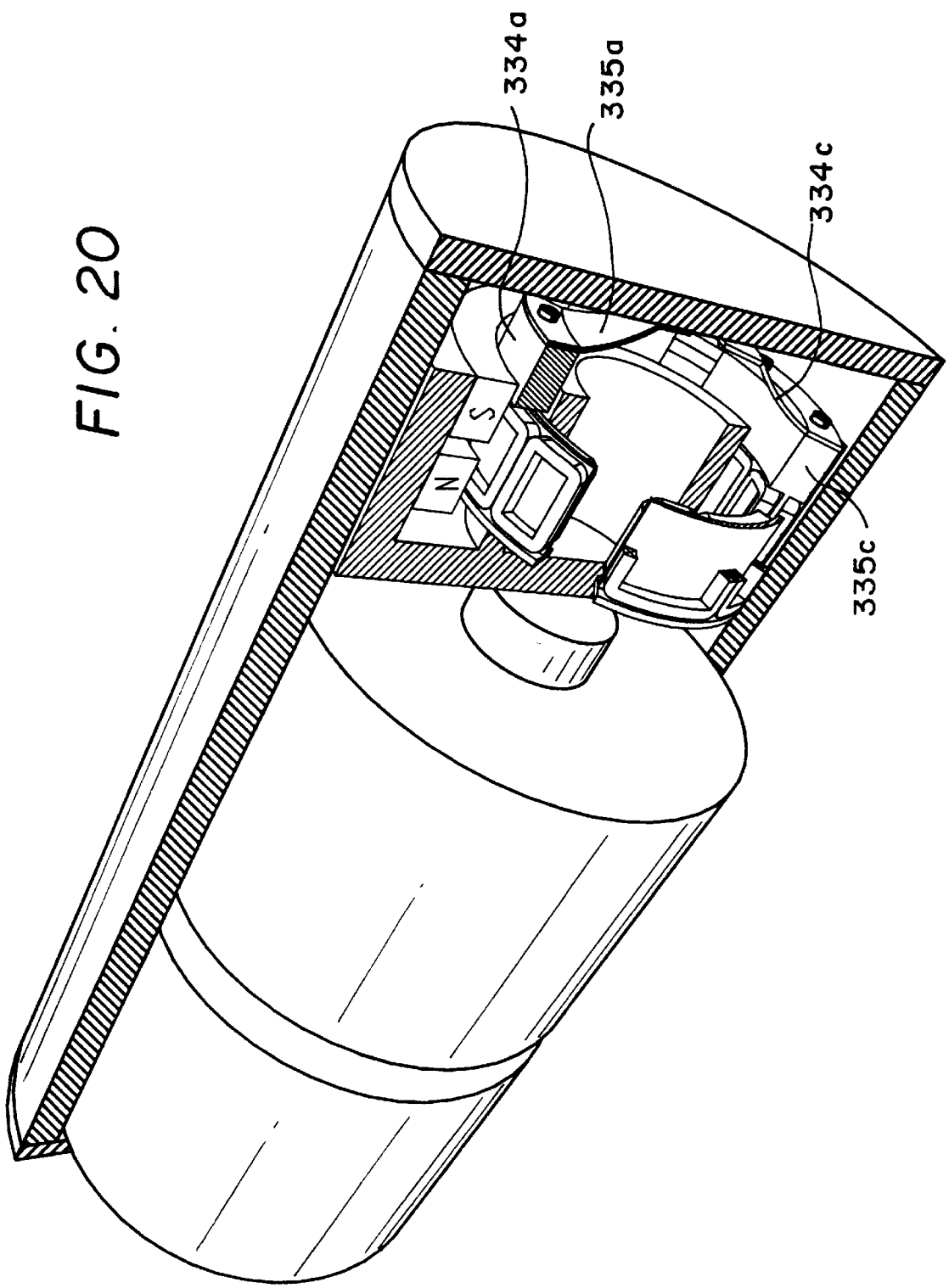

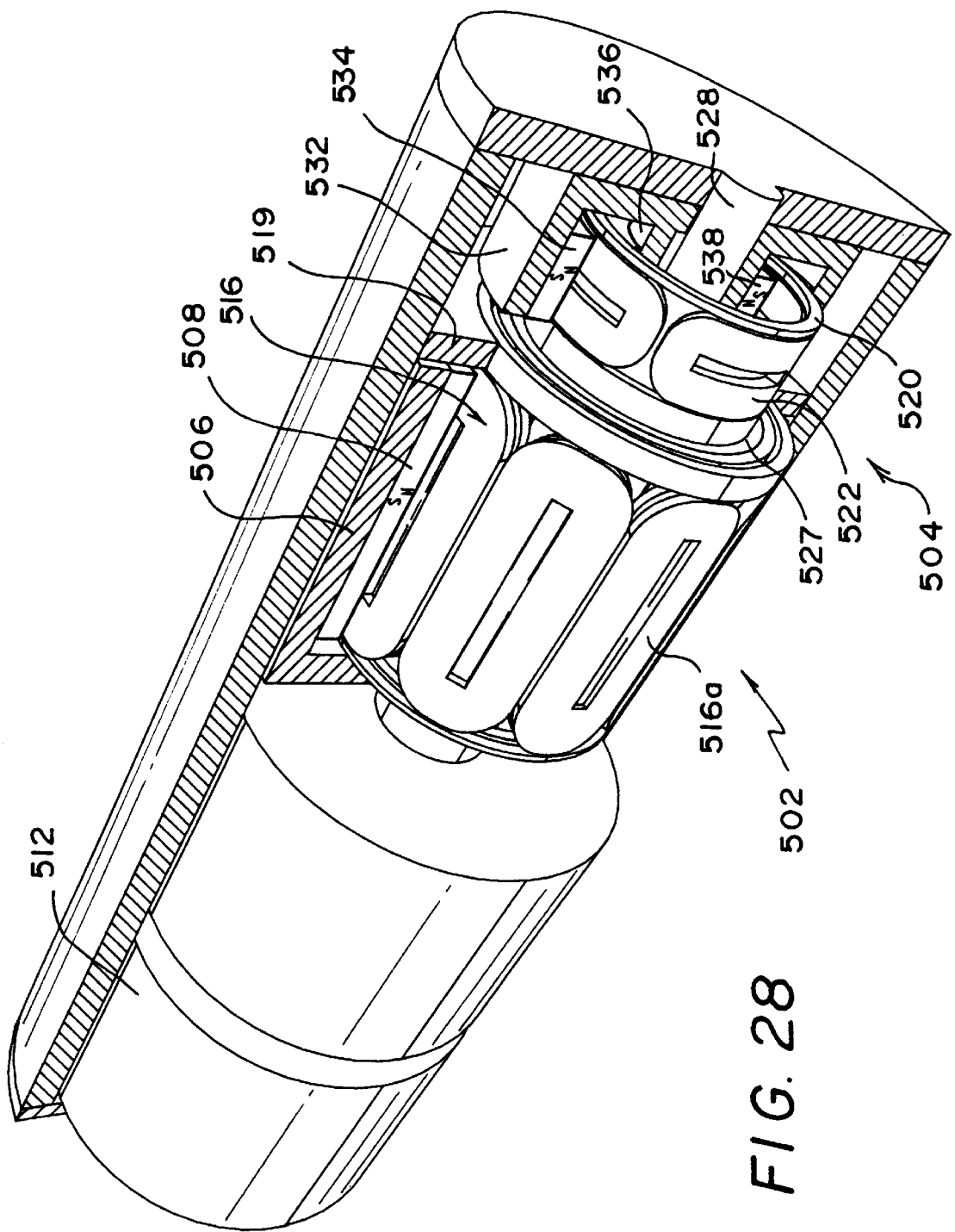

GENERATOR PROVIDING ALTERNATING CURRENT WHICH HAS A SELECTED FREQUENCY

REFERENCE TO RELATED APPLICATIONS

This is a continuation-in-part of U.S. patent application Ser. No. 08/925,078, filed Sep. 9, 1997 now U.S. Pat. No. 5,874,797, which was a continuation of U.S. patent application Ser. No. 08/762,991 filed Dec. 10, 1996, abandoned.

BACKGROUND OF THE INVENTION

This invention relates to electrical generators which rotate at high speeds. Such generators are used for general purposes and in various advanced technologies including hybrid-electric vehicles, variable speed constant frequency engine-generator sets and energy-storage flywheels.

An object of the present invention is to provide an electrical generator which produces an output which is readily and inexpensively convertible into a fully controllable AC output signal.

Rotary electrical generators produce raw alternating current (AC) signals, the frequencies of which are proportional to the generator rotational speeds. For example, a two pole generator running at 3,600 rpm will have a 60 Hz output. However, many generators are driven by devices such as gas turbine engines and energy-storage flywheels which usually rotate at a high speed, 10,000 rpm for example, which is far too fast to produce a raw output signal of 60 Hz. Very high frequency generator AC is unsuitable for most practical purposes. Thus, it has been a practice either to interpose a mechanical speed reducer between the driving device and the generator, or to utilize an electrical circuit which converts the high frequency AC generator output first to direct current (DC) and then to a lower frequency AC.

Speed reducing mechanisms have included reduction gearing, belts, pulleys, and other devices, all of which add to the cost of the system, require maintenance and repairs, and inherently reduce the overall efficiency of the system.

Electrical circuits for processing high frequency generator output signals often use pulse width modulated (PWM) amplifiers. PWM amplifiers are expensive, they generate electrical noise, and they require large heat sinks to dissipate the substantial quantity of heat which they generate. Due to their choppy outputs, they also require large banks of electrical filters such as electrolytic capacitors which are expensive and prone to failure.

A prior art PWM circuit amplifier for processing the electrical output of a high speed generator 1 is shown in FIG. 1. It includes a full wave rectifier 3 which has four diodes and converts the high frequency raw AC signal to a pulsing DC signal and an inverter circuit 5 which is an H-bridge formed of four insulated gate bipolar transistors (IGBTs) which are turned on and off according to a selected pattern to produce an AC signal which has the desired frequency. This signal is fed through a filter network 7 and a transformer 9 to an electrical load. The IGBTs are turned on and off when there is a high voltage across them. This results in power losses and it produces undesired electrical noise.

In systems which utilize the invention, the generator output signal waveform is affected by using an actuator which gives the generator output coils an oscillating motion which is independent of the normal rotary motion of the generator. The oscillation motion moves the generator output coils toward and away from a null flux position at which the generator produces near zero output voltage. The frequency of this oscillating motion is equal to the desired and selected frequency of the final alternating current output of the apparatus. This frequency is referred to in the claims as the "mechanical oscillation frequency." To simplify the conversion of the raw generator output to AC of a useful desired frequency, the actuator is driven by alternating current to produce a mechanical oscillation which has the desired frequency. The power required to drive the actuator is relatively low, preferably less than one percent of the output power of the generator.

Due to the waveform of the output signal from the generator of the present invention, and the relationship between this waveform and the frequency of the signal which energizes the actuator which moves the generator output coils, any electronic circuitry for processing the generator output can be simplified. The circuitry can use electronic switches such as thyristors (often referred to as SCRs) which are commercially available in high power ratings (greater than 1 megawatt, for example) and are less expensive than electronic switches such as IGBTs. Because the SCRs are switched on and off when the voltages are at or near zero, power losses are low, and electrical noise is minimized.

The displacement responsive generator (DRG) according to the present invention, with its output processing circuitry, is believed to be substantially less bulky, less expensive, more efficient, and more reliable than existing systems which utilize mechanical transmissions or PWM amplifier technology.

SUMMARY OF THE INVENTION

This invention relates to an electrical generator for providing alternating current which has a selected frequency. The generator includes a loop assembly and a magnet assembly, one of which is rotatable relative to the other. The magnet assembly has at least one ring of field magnets arranged to provide a circular array of magnetic fields which vary in magnitude from one circumferential position to another. The loop assembly has at least one ring of electrically conductive output loops which are in the magnetic fields and occupy different circumferential positions on the loop assembly. At least a portion of the loop assembly is movable along a displacement path in the magnetic fields to change the position of the output loops with respect to the magnetic fields independently of the relative rotation between the magnet assembly and the loop assembly. An actuator means provides displacement movement which gives the loop assembly an oscillatory motion having a mechanical oscillation frequency along the displacement path. The mechanical oscillation frequency corresponds to the selected frequency. The rotary motion and the oscillatory motion provide, in the loop assembly, a raw amplitude-modulated output signal which has an amplitude which is modulated as a function of the displacement of the loop assembly and a induced current frequency which is a function of the rotary motion. The induced current frequency is higher than the mechanical oscillation frequency, and preferably it is at least ten times the mechanical oscillation frequency. A signal processor converts the raw output signal to an alternating current signal which has the mechanical oscillation frequency.

There are many beneficial but optional features of the invention. For example, it is preferable to rotate the magnet assembly and to support the loop assembly for the above-mentioned displacement movement. It is desirable to utilize an actuator of the Lorentz force type, i.e., an actuator which includes an electrical conductor located in a magnetic field, and means for providing a flow of electrical current in the electrical conductor to produce Lorentz forces which move the loop assembly in the displacement path. The disclosed electrical conductors are coils formed by winding a plurality of loops. One type of loop is spaced from the axis of rotation and is located in a magnetic field which extends in a radial direction; another type of loop is spaced from the axis of rotation and is located in a magnetic field which extends in an axial direction; and, still another type of loop is concentric with the axis of rotation. Means are provided for controlling the flow of current in the actuator loops to control the Lorentz forces which move the loop assembly in its displacement path.

It is also highly desirable to support the loop assembly on a plurality of flexible members which guide it for its displacement movement. Each of the flexible members has a stationary portion and a movable portion. The movable portions of the flexible members are fixed relative to the loop assembly and are movable parallel to the displacement path. The flexible members may be resilient so that they bias the loop assembly to a given position. In a generator where the loop assembly is axially movable, the preferred flexible members are diaphragms which are parallel to and are spaced axially from each other to support and guide the loop assembly for movement in the axial direction.

Preferably, the output loops have nonmagnetic cores, and a ring of these loops is located in a gap which lies between the field magnets and a body which is capable of being attracted by a magnet. This magnetically attractable body can be a back iron or an opposed ring of magnets. The gap thickness is less than one-fifth the distance between the axis of rotation and the center of an output loop which is in the gap.

The field magnets are arranged so that they each have a polarity which is opposite to that of the adjacent field magnets, whereby adjacent magnetic fields are oppositely directed. Depending on the configuration of the field magnet ring, this adjacency can be radial, axial or circumferential.

In some embodiments of the invention exemplified by FIGS. 2–7 and 14–22 where the displacement movement of the output loops is in an axial direction, there is a first ring of field magnets and a second ring of field magnets. The second ring of field magnets is axially offset with respect to the first ring of field magnets, and the field magnets are positioned to provide radially directed magnetic fields. Movement of the loops in the axial displacement path changes the positions of the output loops to increase the exposure of the output loops to the magnetic fields from the first ring of field magnets and to decrease the exposure of the output loops to the second ring of field magnets.

In other embodiments of the invention where the displacement movement of the loops is in a radial direction as shown in FIGS. 23–27, the field magnets are positioned to provide axially directed magnetic fields. There is a first ring of field magnets and a second ring of field magnets. The first ring of field magnets is radially spaced from the second ring of field magnets. Each of the output loops is in the magnetic fields produced by both rings of field magnets, whereby the radial displacement movement changes the positions of the output loops. This position change increases the exposure of an output loop to the magnetic fields from the first ring of field magnets, and it decreases the exposure of the same output loop to the magnetic fields from the second ring of field magnets.

In other versions of the invention, the displacement movement is a relative angular movement between two rings of output loops. Examples of such versions are illustrated in FIGS. 28–39. The loop assembly has first and second rings of loops. These rings are concentric, and the displacement movement is an angular movement of the first ring of loops which varies the relative angular position between the loops of the first ring and the loops of the second ring. The loops of the first ring are electrically connected to the loops of the second ring to provide the raw output signal. The angular displacement movement changes the position of one of the output loops relative to its respective magnetic fields, thus changing the raw output signal and causing a difference in phasing between voltages induced in the first and second rings of output loops.

Output loop rings which are relatively angularly displaceable can overlap as shown in FIGS. 28–34 so they are simultaneously exposed to magnetic fields from one ring of field magnets. Alternatively, as shown in FIGS. 35–39, two axially spaced rings of field magnets can be provided. One ring of field magnets provides magnetic fields to the first ring of loops, and the other ring of field magnets provides magnetic fields to the second ring of output loops.

In some embodiments of the invention, the displacement path includes a null position where the loops are exposed to zero net flux during relative rotation between the magnet assembly and the loop assembly. The oscillatory movement includes excursions on opposite sides of the null position. The generator can be constructed so that the loop assembly is movable to the null position.

The signal processor preferably includes at least four semiconductor switches, either diodes or thyristors, arranged as a bridge. The state of the bridge is changed when the raw generator output signal has a zero voltage crossing, and the bridge converts the raw output signal to an alternating current signal which has the mechanical oscillation frequency. The signal processor can include a capacitor and/or an inductor which smooth the bridge output to provide an alternating current signal which is substantially a sine wave.

One signal processor exemplified by the circuit shown in FIGS. 8 and 9, includes a full wave rectifier and a transformer. The full wave rectifier produces, at its output, a signal in the form of a sine wave which does not cross an axis which represents zero voltage. The primary windings of the transformer are connected to the output of the rectifier, and the secondary windings of the transformer provide the alternating current signal which has the mechanical oscillation frequency.

As will be described in connection with FIGS. 10 and 11, one embodiment of the signal processor includes a full wave rectifier for producing a signal which has identical adjacent half-waves, and an inverter circuit for reversing alternate half-waves to provide an alternating current output signal.

The actuator means may take many forms. In one embodiment of the invention illustrated in FIGS. 14, 15 and 16, at least one ring of actuator loops lies in the magnetic fields of the magnet assembly. In this embodiment, the actuator means includes a first ring of actuator loops which lie in the magnetic fields of a first ring of field magnets, and a second ring of actuator loops which lie in the magnetic fields of a second ring of field magnets. The first and second rings of actuator loops are fixed with respect to the loop assembly. The current induced in the actuator loops by their movement in the magnetic fields is controlled to produce Lorentz forces which move the loop assembly axially.

Alternatively, as shown in FIGS. 17–22, the actuator means can include a ring of actuator loops which lie in the magnetic fields of both a first ring of magnets and a second ring of magnets. The ring of actuator loops is fixed with respect to the loop assembly so that current flowing in the actuator loops produces Lorentz forces which move the loop assembly axially.

One actuator means which is disclosed in FIGS. 17–19 has actuator loops which are located between the output loops. A ring of output loops and a ring of actuator loops have a same diameter and form an output/actuator ring. There can be two such output/actuator rings of different diameters, both of which lie in the magnetic fields of two rings of field magnets.

BRIEF DESCRIPTION OF THE DRAWINGS

FIG. 11e shows the output signal from the circuit of FIG. 10, after alternate half-waves of the signal shown in 11d have been inverted to produce an output signal which has the same frequency as the actuator signal shown in FIG. 11a.

FIG. 20 is a fragmentary perspective view of a fourth embodiment of the invention which is a variation of the embodiment shown in FIG. 17.

FIG. 28 is a fragmentary perspective view of a sixth embodiment of the invention in which the generator output coils are mounted on two overlapping concentric cylinders.

DETAILED DESCRIPTION OF THE PREFERRED EMBODIMENTS

The First Embodiment

Figure 1:
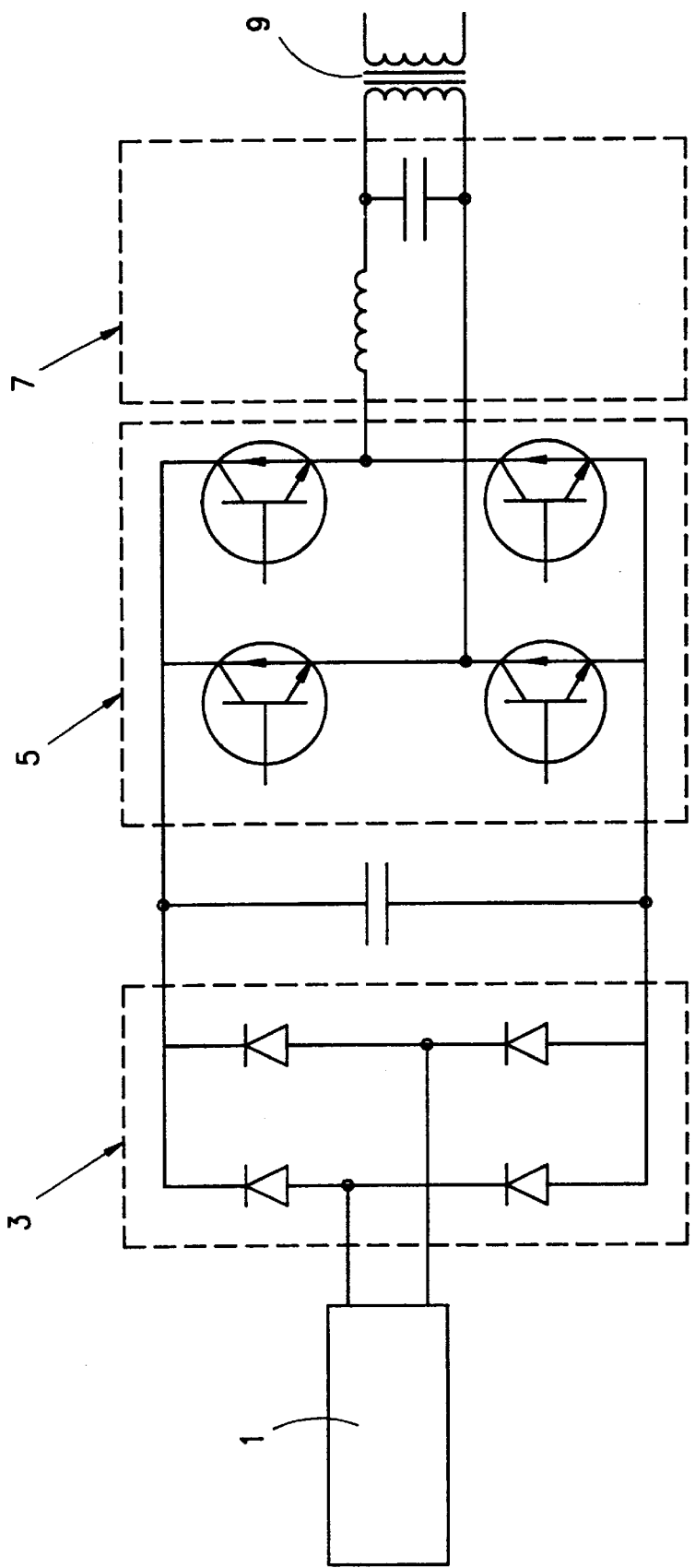
FIG. 1 shows a circuit used in the prior art for converting high frequency AC from a generator to a lower frequency AC.
Figure 2:
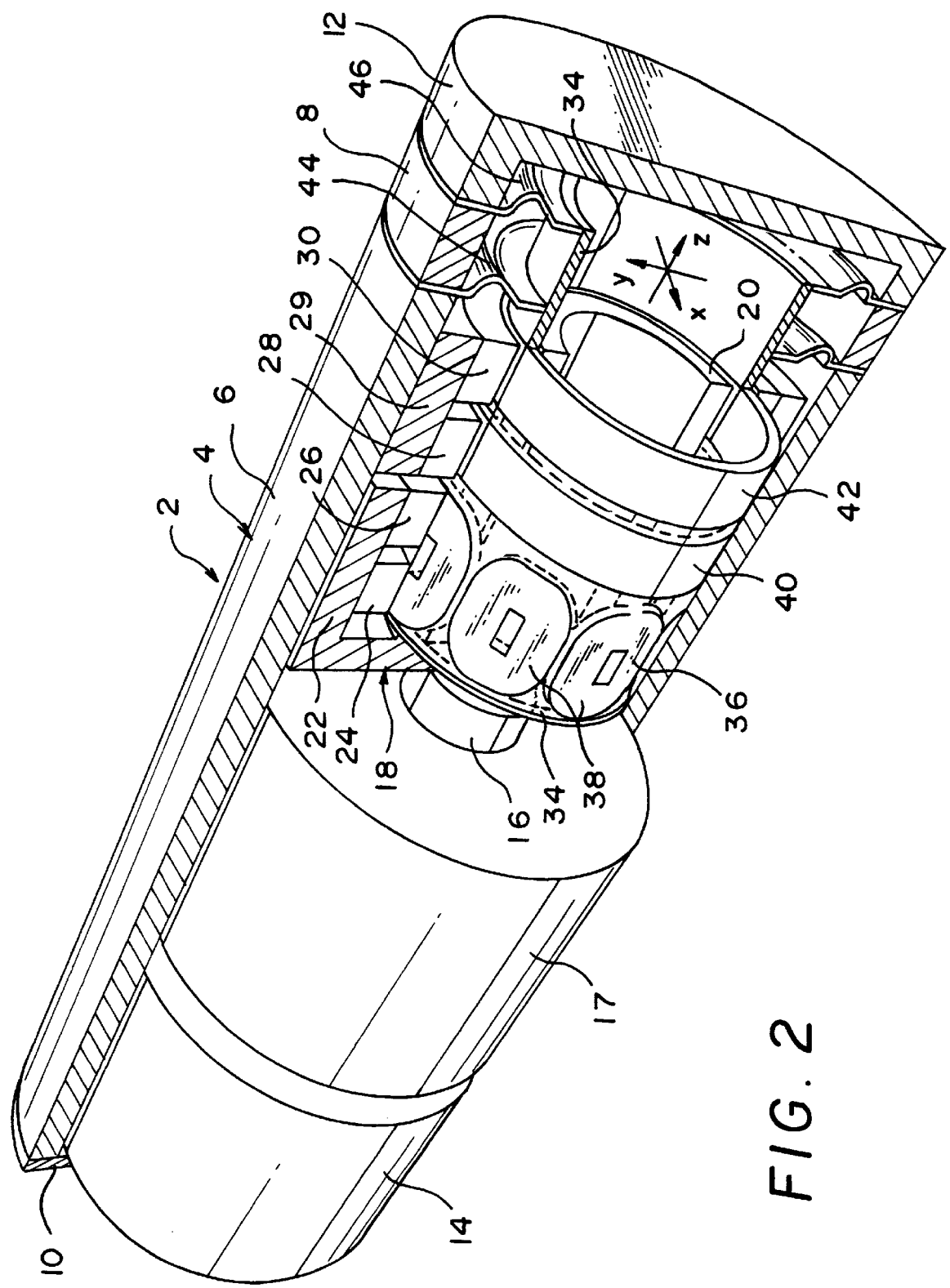
FIG. 2 is a perspective view of a first embodiment of the invention in which generator output coils are displaced axially by an actuator.
Figure 3:
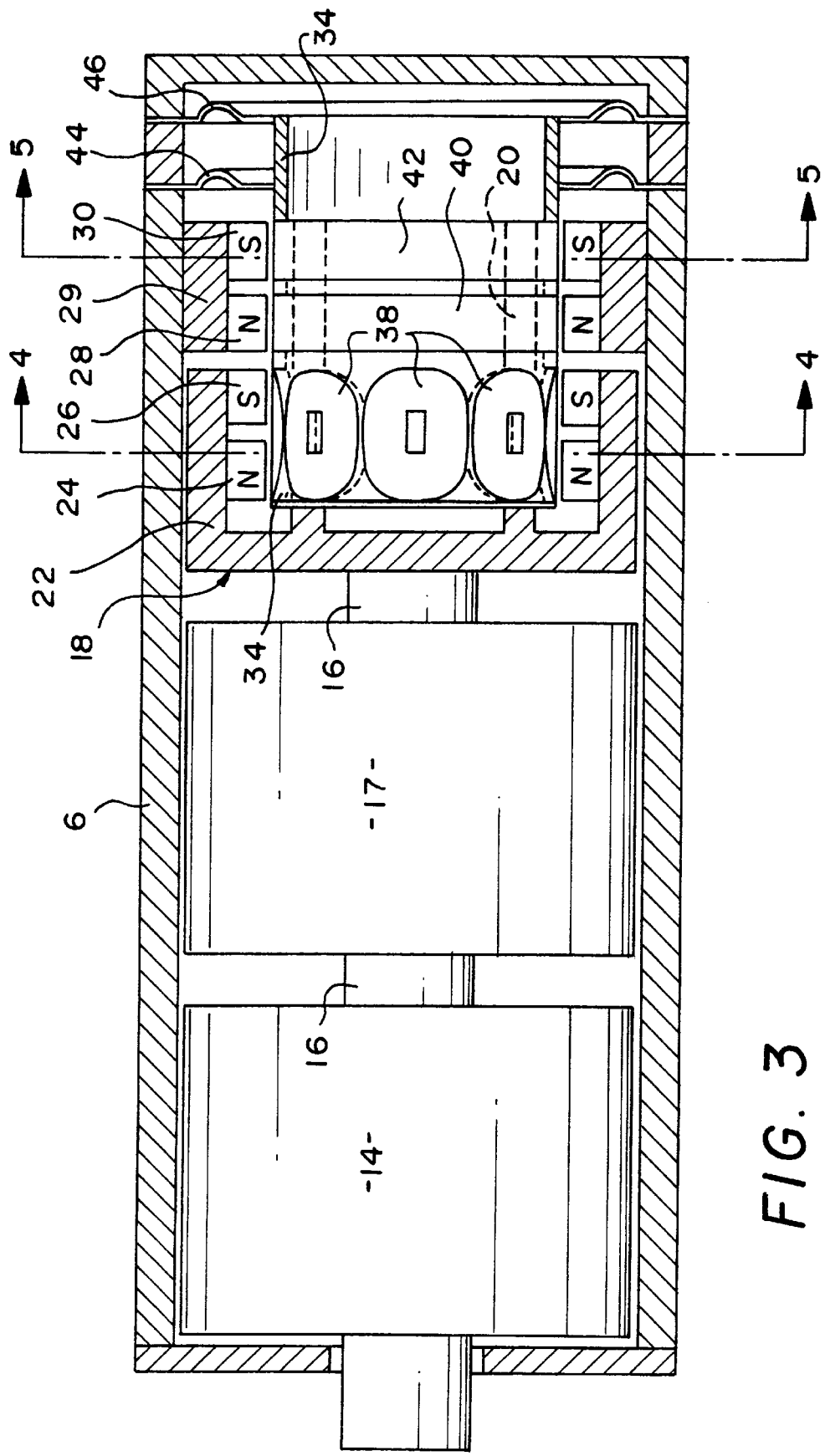
FIG. 3 is a longitudinal sectional view of the apparatus of FIG. 2.

FIGS. 2 and 3 show a first embodiment of the invention in which there are rotating rings of magnets, a nonrotating ring of generator output coils which is positioned in the fields emanating from the rotating magnets, and actuator coils which move the ring of generator coils in an axial displacement path to vary the output of the generator. This apparatus 2 includes a non-magnetic housing 4 which is formed of aluminum and includes a cylindrical main body 6, a cylindrical segment 8, and two end pieces 10 and 12. Inside the housing, there is an a prime mover 14 with a rotating shaft 16 which rotates an optional flywheel 17 and a magnet assembly 18.

The prime mover 14 is preferably a gas turbine engine, but it can be an internal combustion engine, an electric motor or another suitable driving means.

In an orthogonal reference system represented by the three mutually perpendicular arrows x, y, and z in FIG. 2, the z-axis is the axial direction and it is coincident with the axis of rotation. The z-axis is horizontal, but it can be vertical as in the apparatus which will subsequently be described in connection with FIG. 35. The horizontal x-axis and the vertical y-axis define a radial plane which is vertical in FIG. 2.

The magnet assembly 18 includes a cylindrical inner back iron 20 and a cylindrical outer back iron 22. The outer back iron 22 carries two axially spaced rings 24 and 26 of generator field magnets and two axially spaced rings 28 and 30 of actuator magnets. These magnets are mounted on a back iron 29 which, in turn, is rigidly attached to the main body 6 of the housing 4. Between the inner and outer back irons, a nonmagnetic mounting cylinder 34 supports a ring 36 of generator output coils 38 and two annular actuator coils 40 and 42. A "back iron" is a body which is capable of being attracted by a magnet, so it provides a path for the magnetic flux from the field magnets.

The generator output coils 38 are located in the annular gap between the back iron 20 and the inwardly facing pole faces of the field magnets. The thickness of this gap is less than one-fifth the radius of the cylinder 34. This radius represents the distance between the axis of rotation and the center of any of the output coils 38.

Each coil 38 is formed by winding one or more continuous wires so that it includes multiple loops of wire which are in series with each other. A coil can be formed as a single loop or of multiple loops connected in parallel with each other, so the broad terms "loop" and "loop assembly" are used in the claims to describe the coils and the rings of coils, respectively.

Figure 35:
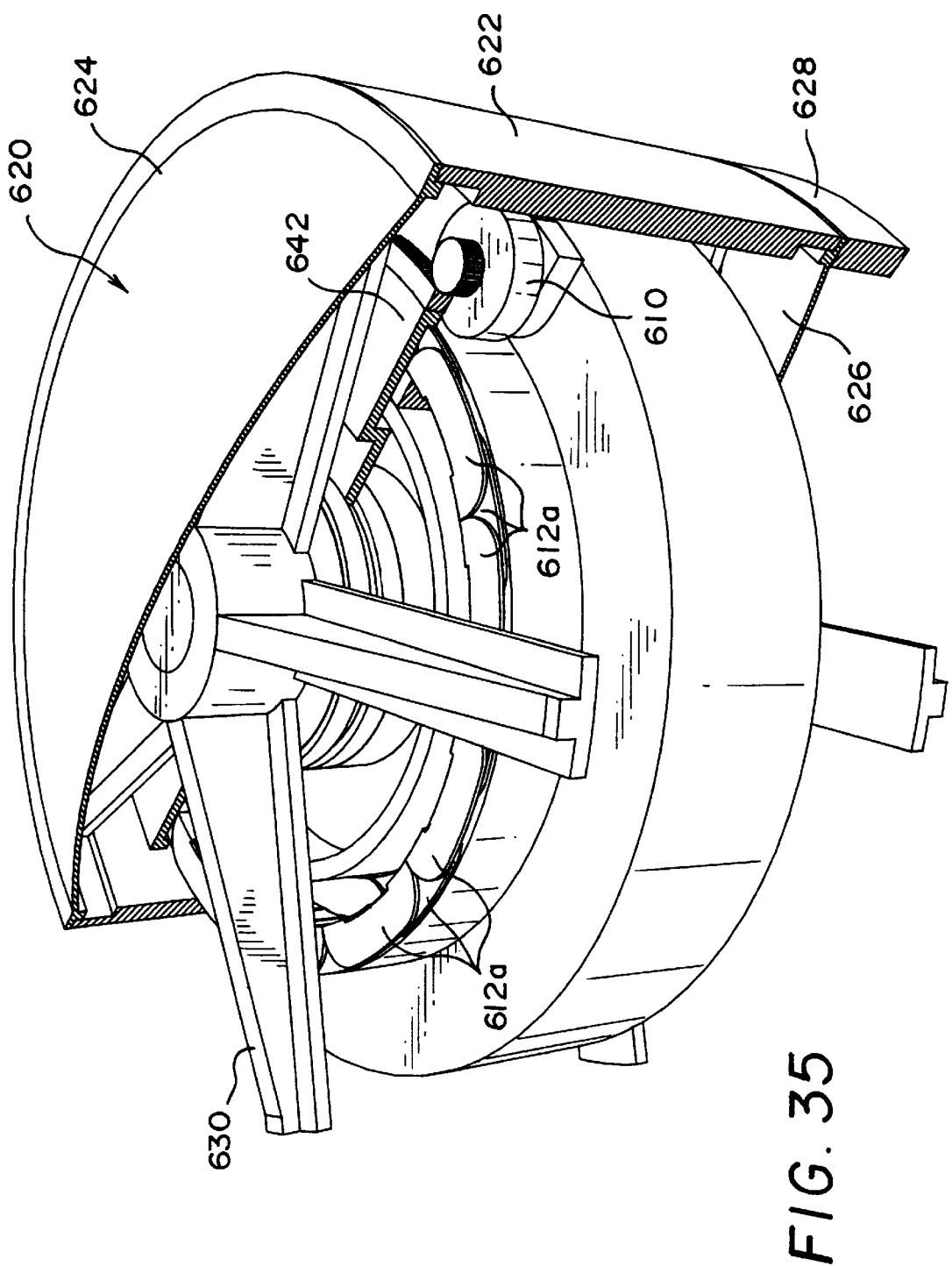
FIG. 35 is a perspective view of a seventh embodiment of the invention, wherein the generator is associated with an energy-storage flywheel. Two sets of coils are angularly shiftable in order to vary the generator output.
Figure 36:
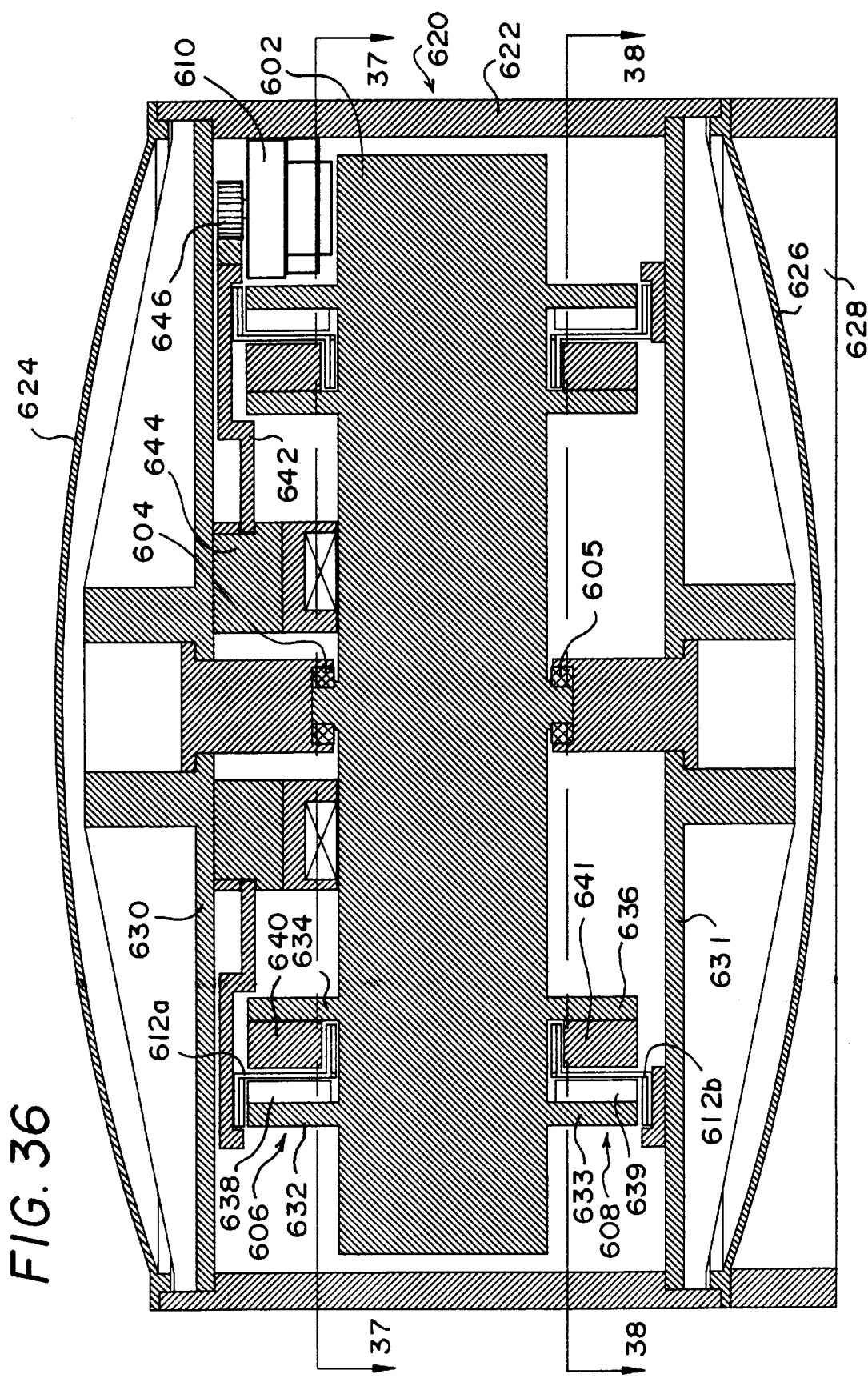
FIG. 36 is a vertical sectional view through the apparatus of FIG. 35.
Figure 37:
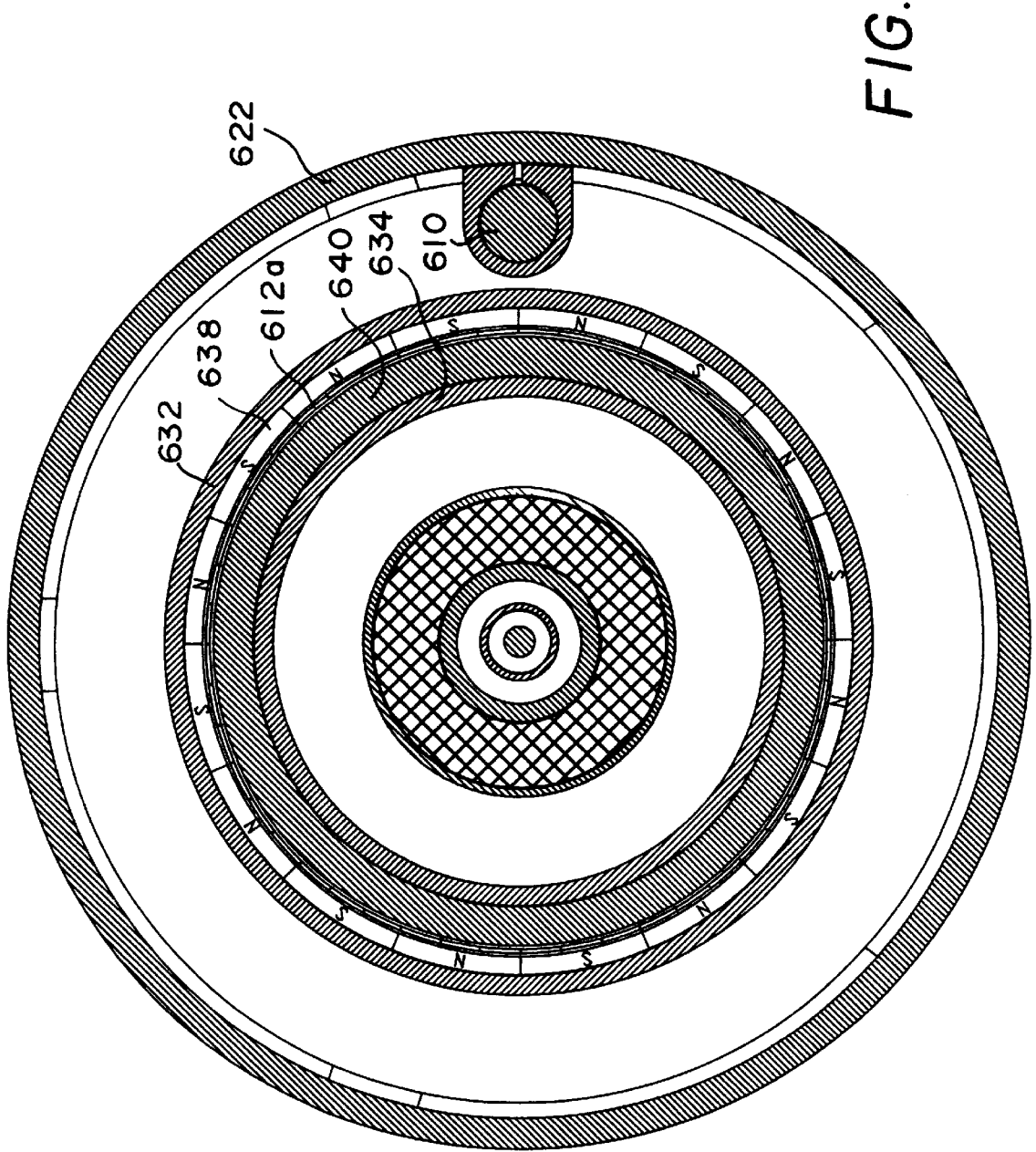
FIG. 37 is a horizontal sectional view along section line 37—37 in FIG. 35, taken through the upper rings of magnets and coils.
Figure 38:
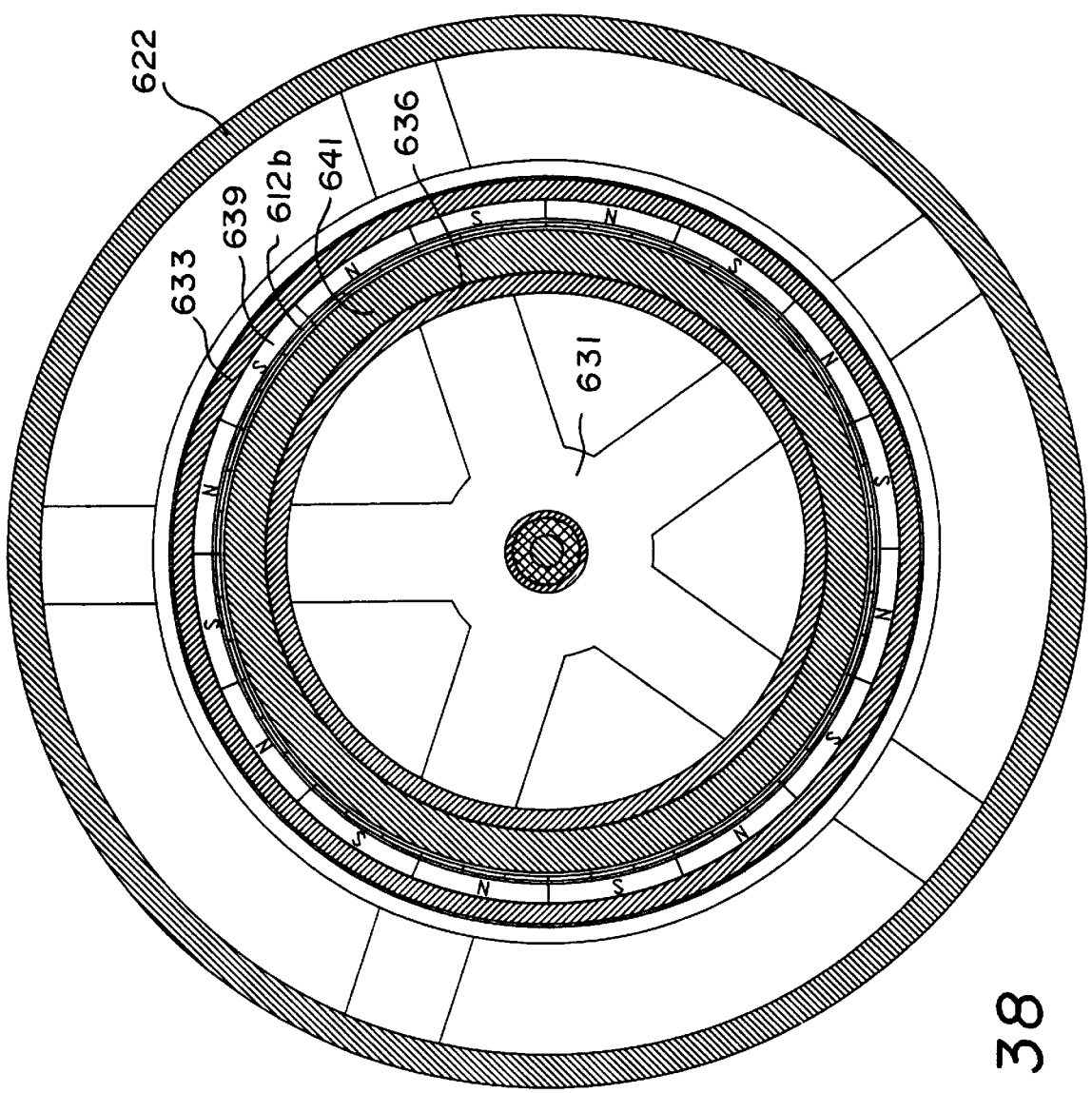
FIG. 38 is a horizontal sectional view taken through section line 38—38 in FIG. 35, taken through the lower rings of magnets and coils.

The coils 38 occupy different circumferential positions on the coil assembly. Thus, they are not coincident with each other but they may overlap as shown in FIG. 35.

The cylinder 34 is supported and guided by a pair of resilient diaphragms 44 and 46 which are fixed to the housing 4 and have sufficient flexibility to permit the mounting cylinder 34 and the coils mounted on it to move in an axial direction indicated by the arrow z. The diaphragms are parallel to and spaced axially from each other. The peripheral portions of the diaphragms are stationary, and their inner portions are fixed relative to the loop assembly. The diaphragms bias the output loop assembly toward the neutral or null flux position shown in FIG. 3.

Figure 5:
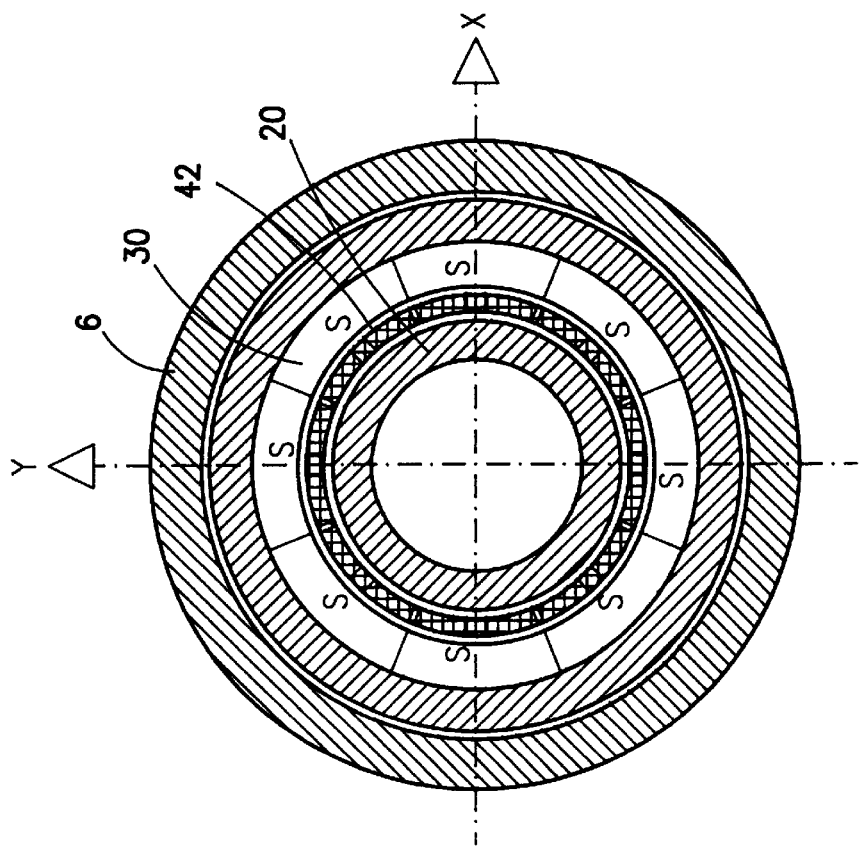
FIG. 5 is a transverse sectional view of the apparatus of FIG. 1 as seen along the line 5—5 in FIG. 3, showing components of the actuator.
Figure 4:
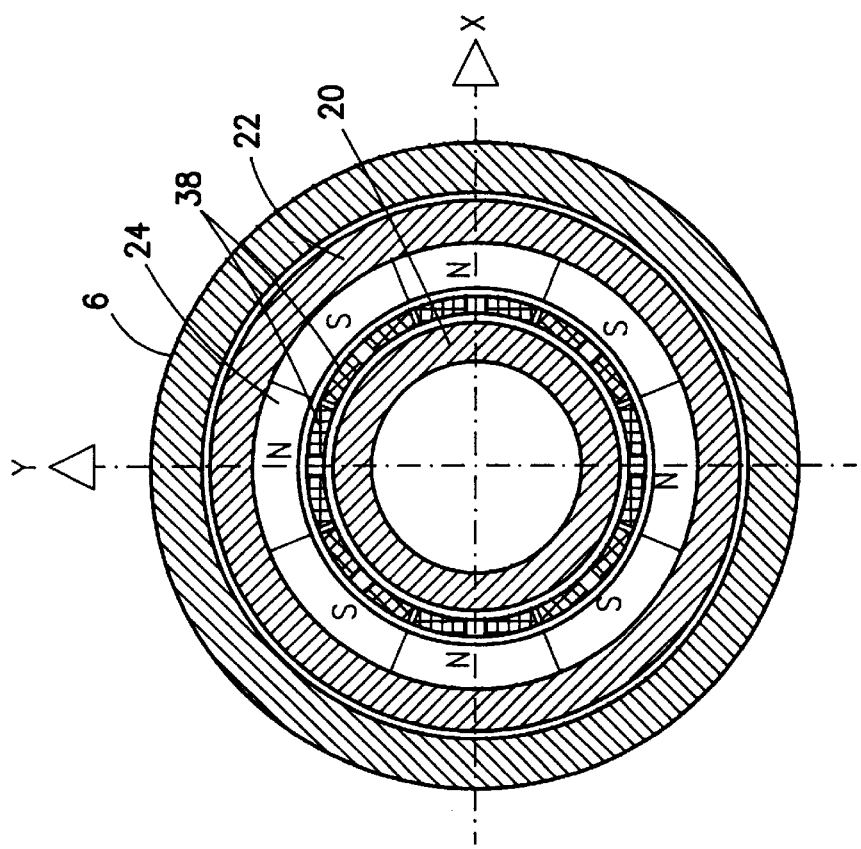
FIG. 4 is a transverse sectional view of the generator of FIG. 2, taken along the line 4—4 in FIG. 3 showing components of the field magnet rings and generator output coils.

Each magnet ring 24 and 26 is formed of eight radially polarized magnets. Each magnet occupies forty-five degrees of the circumference of the ring, and the polarities alternate from magnet-to-magnet as shown in FIG. 4. The actuator magnet rings 28 and 30 are similar except that, as shown in FIG. 5, the polarities in each ring are uniform. The rings 28 and 30 have opposite polarities.

Rather than having a continuous ring of magnets with circumferentially alternating polarities such as ring 24 in FIG. 4, for example, it is possible to form a ring of magnets with only uniform polarities, circumferentially spaced from each other. Both of these types of magnet rings will provide a circular array of magnetic fields which vary in magnitude from one circumferential position to another.

The rings 24 and 26 of the magnet assembly have equal diameters, they are concentric, and they are axially offset from each other. The generator output coils 38 lie in the magnetic fields of both rings 24 and 26 of field magnets. Displacement of these output coils 38 in an axial direction will vary the proportion by which each coil is exposed to the magnetic fields of the first magnet ring 24 and the magnetic fields of the second magnet ring 26.

The axial displacement of the ring 36 of coils 38 is produced by the annular magnet rings 28 and 30 and the helically wound cylindrical coils 40 and 42 on the mounting cylinder 34. An electrical power supply energizes the coils 40 and 42, and the magnitude and direction of the current determines the direction and amplitude of the axial movement of cylinder 34, thus affecting the extent to which the generator coils 38 are exposed to the fields of the two rings 24 and 26 of field magnets.

The coils 38 are movable along the z-axis displacement path in the magnetic fields toward and away from a null position at which the coils are exposed equally to the oppositely directed fields of the two magnet rings. At the null position, the coils are exposed to zero net flux from the magnet rings 24 and 26. When the actuator coils 40 and 42 are supplied with alternating current, the axial movement of the mounting cylinder and the coils thereon is oscillatory, thus providing excursions on opposite sides of the null position.

Figure 6C:
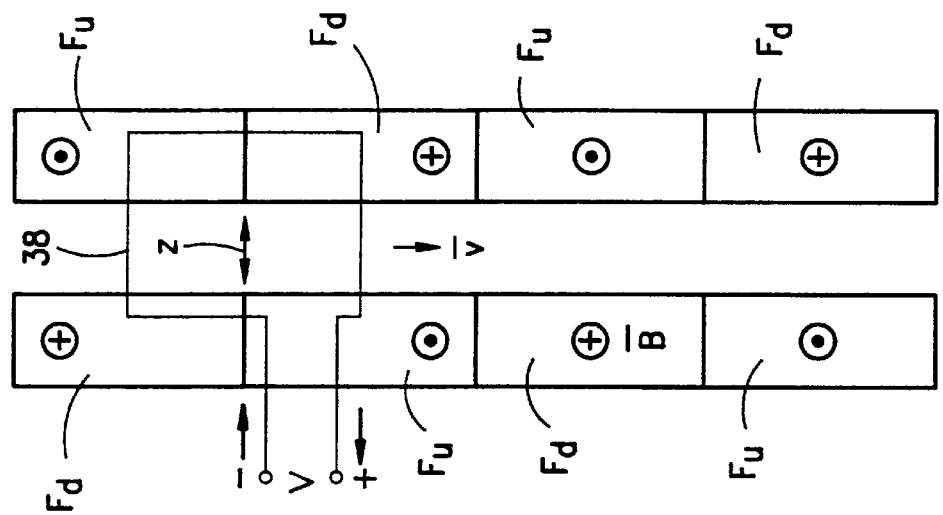
FIGS. 6a, 6b, and 6c are diagrammatic views which show how voltages are induced and currents flow in the generator output coils in the embodiment of FIG. 2, at different axial positions of the output coils.
Figure 6B:
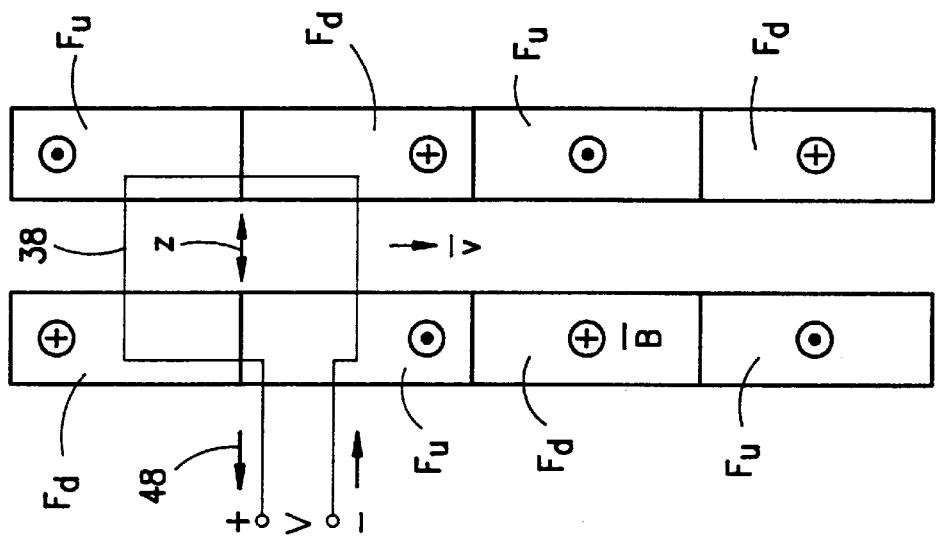
Figure 6A:
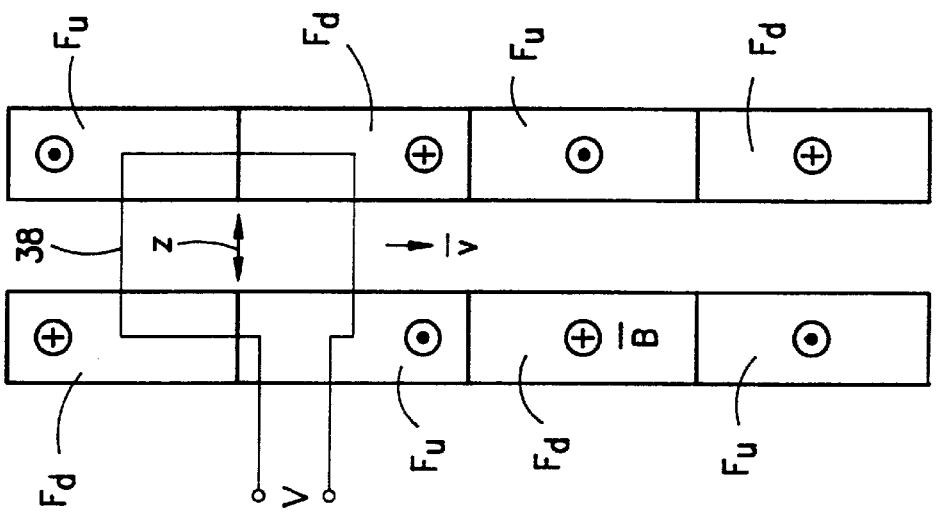

FIGS. 6a, 6b and 6c show diagrammatically how voltages are induced in one of the generator output coils 38. The coil is located where it will be exposed to the magnetic fields $F_d$ which are directed down into the plane of the drawings and the magnetic fields $F_u$ which are directed up from the plane of the drawings. Rotation of the field magnet assembly moves the magnetic fields in the direction of the arrow V. The coil 38 is at a fixed location lengthwise of the paths of the magnetic fields.

Figure 7:
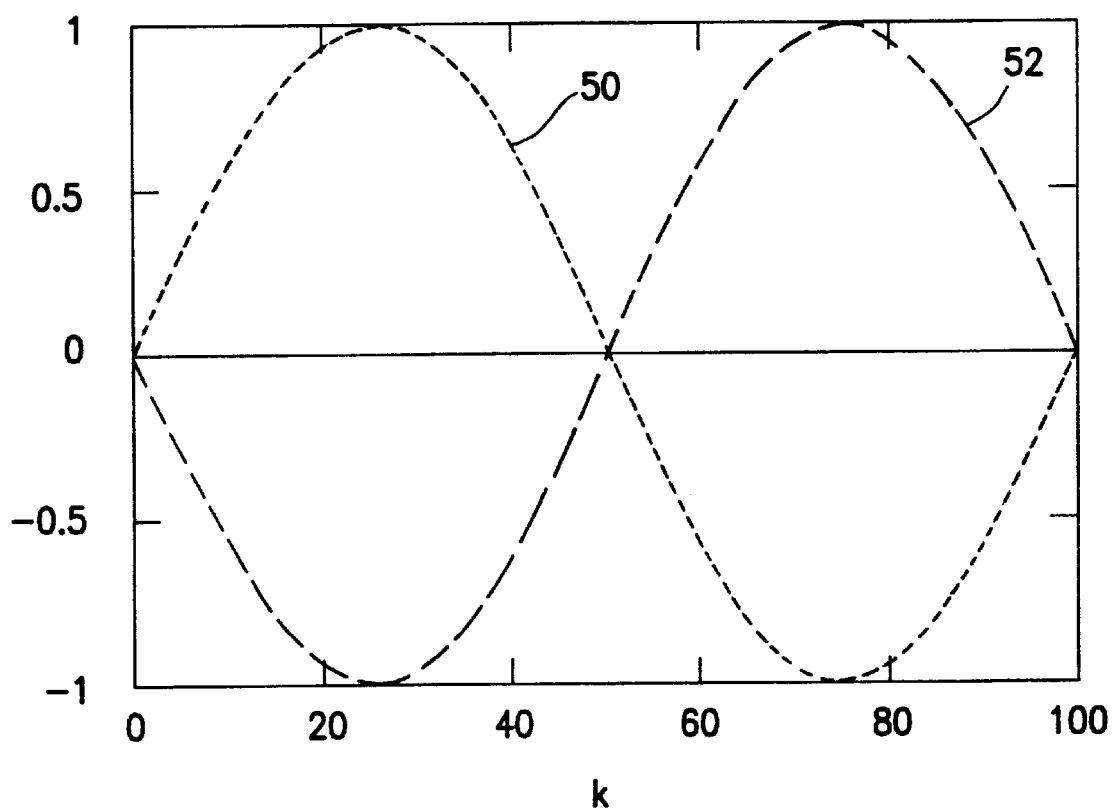
FIG. 7 shows the AC waveforms generated when the generator output coils are in the positions illustrated in FIGS. 6b and 6c.

In the neutral or null flux position shown in FIG. 6a, the coil 38 is exposed equally to the left and right magnetic field rings. In FIG. 6b, the coil has been shifted leftward by its actuator so it has a greater exposure to the left field ring than to the right field ring. This results in the flow of current in the direction indicated by the arrow 48 when the generator is connected to a load. This direction will change when the left-shifted loop is in the subsequent magnetic fields which are oppositely directed. This produces the alternating voltage shown in FIG. 7 as waveform 50. An opposite waveform 52 illustrated in FIG. 7 is produced when the coil is shifted to the right position as shown in FIG. 6c. The induced voltage has a carrier frequency which is dependent on the rotational speed of the magnet rings, and an amplitude which is dependent on the axial displacement of the coil 38 from its null flux position in the direction of the axial displacement path represented by the arrow z. For any given displacement position, this amplitude is also proportional to the generator's rotational speed and the magnetic flux density of the magnet fields. Movement of the loop assembly along its displacement path changes the position of the output loops with respect to the magnetic fields independently of the relative rotation between the magnet assembly and the loop assembly.

From the foregoing, it will be understood that, when the actuator coils 40 and 42 are not energized, the generator will provide no output except for an insignificant output resulting from imperfections in the magnets and coils. The generator coils 38 will lie in their null flux position. However, when the actuator coils are energized, the mounting cylinder 34 will move axially to displace the generator coils 38 from their null flux positions so that alternating voltages will be generated in the output coils 38. This voltage constitutes a raw amplitude-modulated output signal which can be converted to a final output signal by a signal processor. The raw output signal is an amplitude-modulated signal, similar to an AM radio signal in the respect that it has a carrier frequency and a modulated amplitude. The carrier frequency of the generator's output signal is referred to in the claims as the "induced current frequency." It normally is constant and it is a function of the generator's rotational speed. The amplitude of this raw output signal is modulated as a function of the displacement of the loop assembly. This displacement takes the form of an oscillatory motion of the loop assembly, and the frequency of this oscillatory motion is equal to the selected frequency of the desired final generator output signal. The induced current frequency is higher than the mechanical oscillation frequency, and it preferably is at least ten times the mechanical oscillation frequency.

Figure 8:
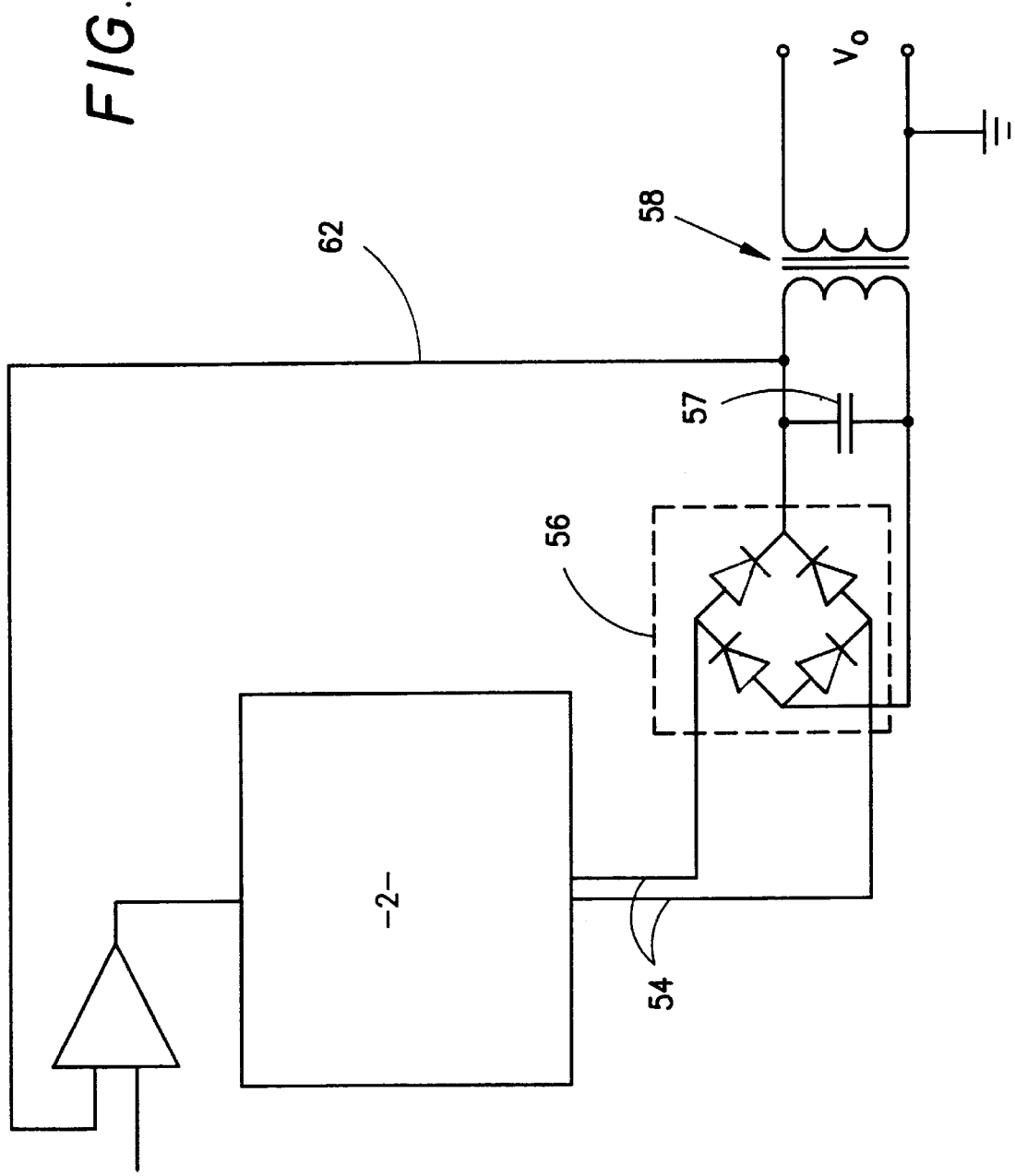
FIG. 8 shows one circuit for converting a high frequency alternating current signal from the generator of FIG. 2 into a lower frequency alternating current signal, the frequency of which corresponds to that of the axial movement of the generator coils.
Figure 9A:
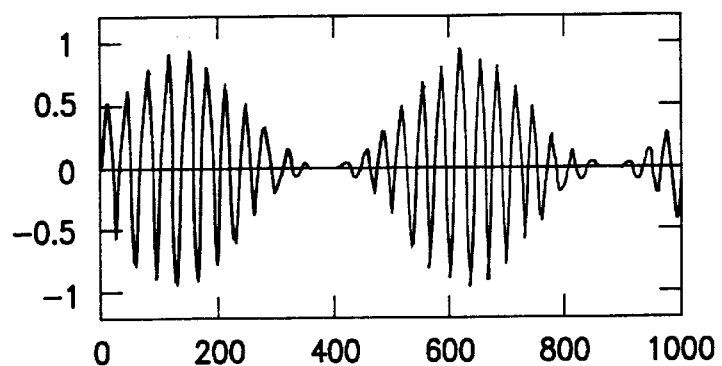
FIG. 9a shows the waveform of the generator output which is fed to the circuit shown in FIG. 8.
Figure 9B:
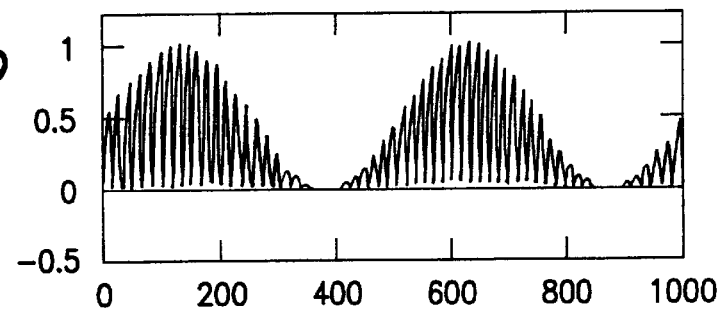
FIG. 9b shows the signal at the output of the full wave rectifier in the circuit of FIG. 8.
Figure 9C:
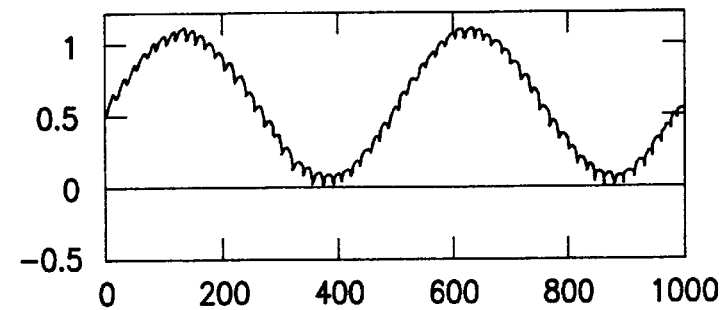
FIG. 9c shows the filtered waveform at the input of the transformer in the circuit of FIG. 8.
Figure 9D:
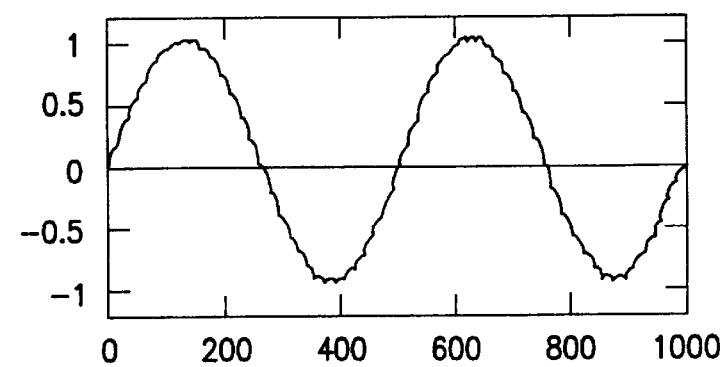
FIG. 9d shows the filtered waveform at the output of the transformer in the circuit of FIG. 8.

A basic circuit for processing the raw signal from the output coils of generator 2 is shown in FIG. 8. The generator output signal which is fed to this circuit is shown in FIG. 9a. It is an alternating current which has a carrier frequency which is dependent on the rotational velocity of the generator. This signal is transmitted by lines 54 to four diodes arranged as a full wave rectifier bridge 56. The output of this bridge, shown in FIG. 9b, is in the form of a sine wave which does not cross an axis which represents zero voltage. It can optionally be smoothed by a capacitor 57 and the primary windings of a transformer 58 which act as an inductor. The output $V_O$ of the signal processor is taken from the secondary windings of the transformer 58, and its waveform is shown in FIG. 9d. A feedback loop 62 can be connected to the controls which ultimately lead to the actuator coils 40 and 42 of the generator.

Figure 10:
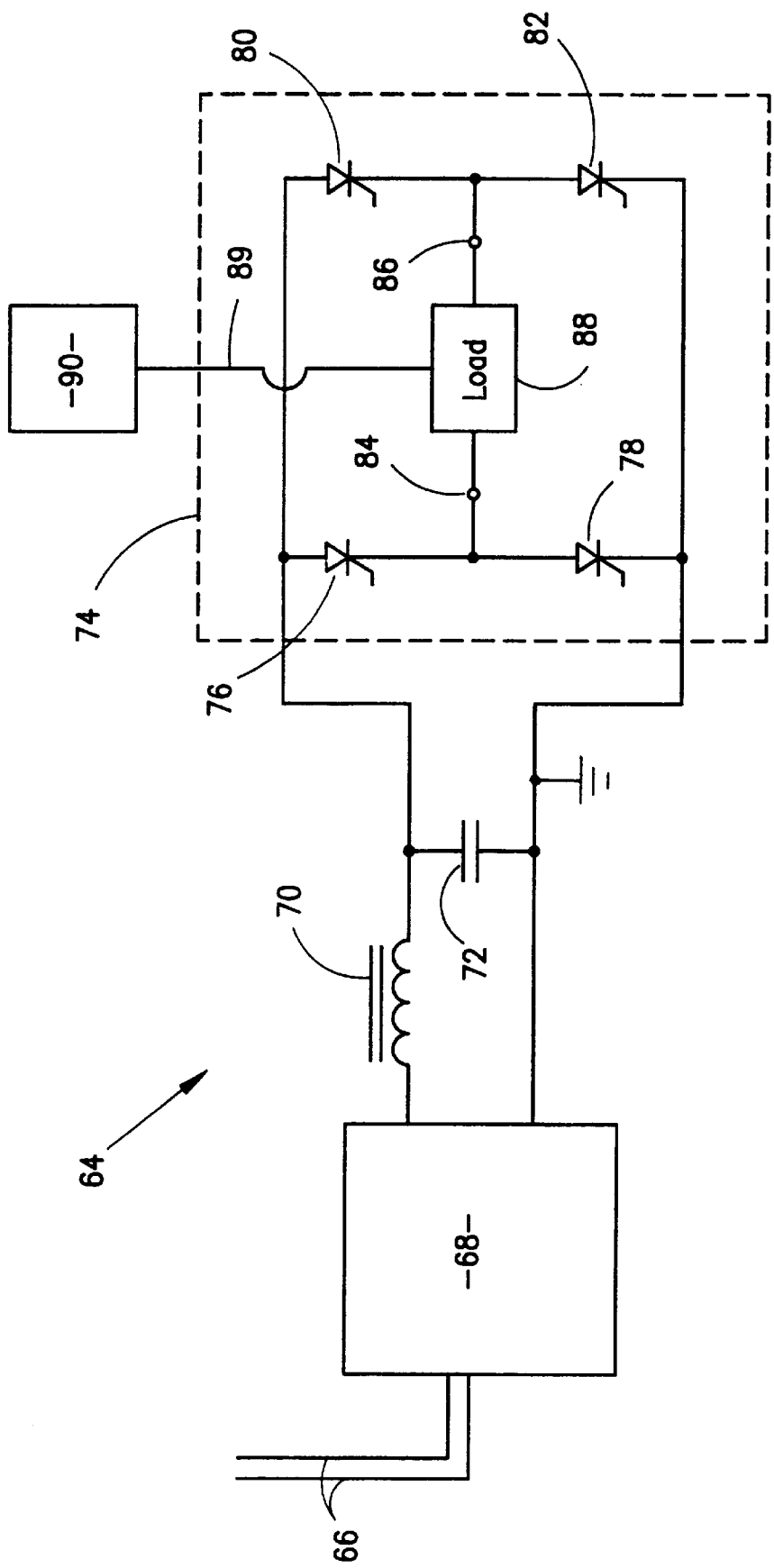
FIG. 10 shows another circuit for converting a high frequency alternating current signal from the generator of FIG. 2 into a lower frequency alternating current signal, the frequency of which corresponds to that of the axial movement of the generator coils.
Figure 11A:
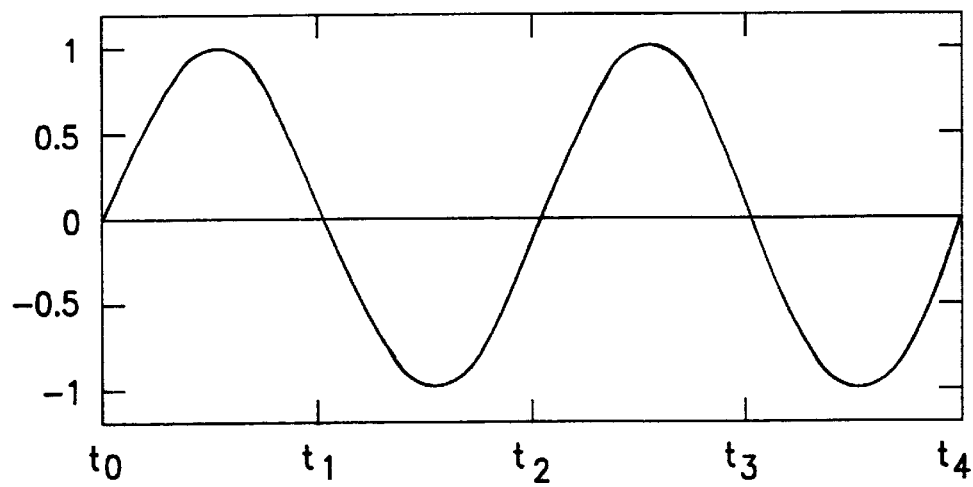
FIG. 11a shows the waveform of the electrical input to the actuator utilized to produce the signal for the circuit shown in FIG. 10.
Figure 11B:
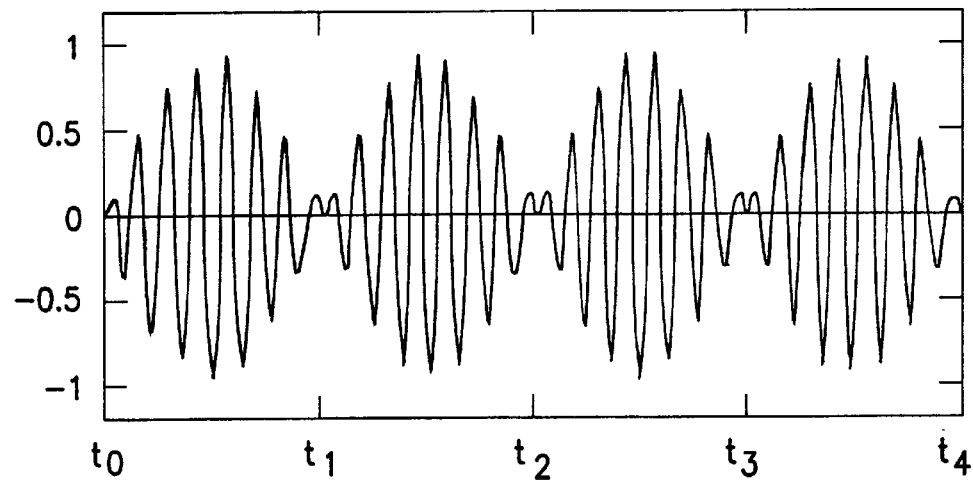
FIG. 11b shows the waveform of the output signal of the generator, which is the input signal to the circuit of FIG. 10.

An alternative output circuit shown in FIG. 10 can provide an alternating current output. This circuit 64 is coupled by lines 66 to the output coils of the displacement responsive generator 2. The raw amplitude-modulated output signal received by the circuit of FIG. 10 is shown in FIG. 11b. It is an alternating current which has a high frequency which is a function of the generator's rotational velocity. Thirty cycles are shown in FIG. 11b. The amplitudes are dependent upon the displacement of the coils 38 from the null flux position, and they vary from minimums at times $t_0, t_1, t_2$, and $t_3$ to maximums which occur midway between the minimums. The coils move in an oscillatory manner relative to the null flux position because the signal which is supplied to the actuator coils to produce their axial movement is the AC signal shown in FIG. 11a. The loop assembly oscillates in phase with the AC signal fed to the actuator coils. Preferably, the frequency of the mechanical oscillation produced by the actuator (which in this embodiment is the same as the frequency of the coil-actuating signal) is no more than about 10% of the carrier frequency of the generator's raw output signal, and it is equal to the desired output frequency of the signal processor.

Figure 11C:
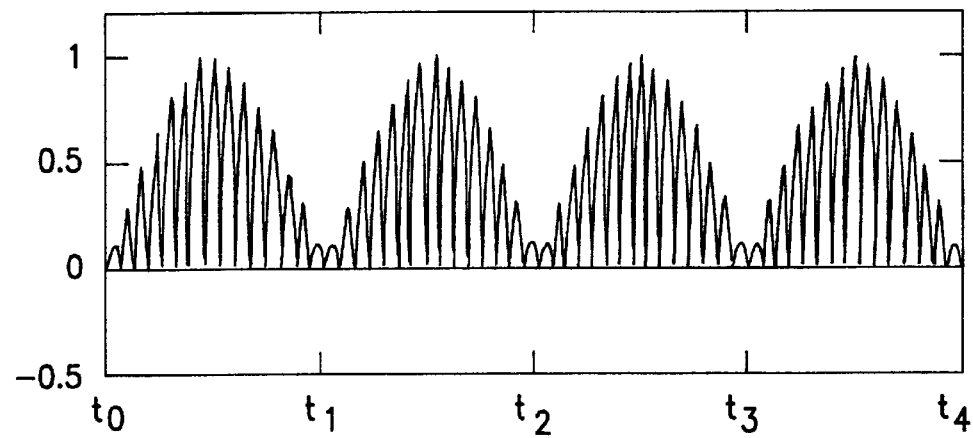
FIG. 11c shows the signal in the circuit of FIG. 10 at the output of the fill wave rectifier.
Figure 11D:
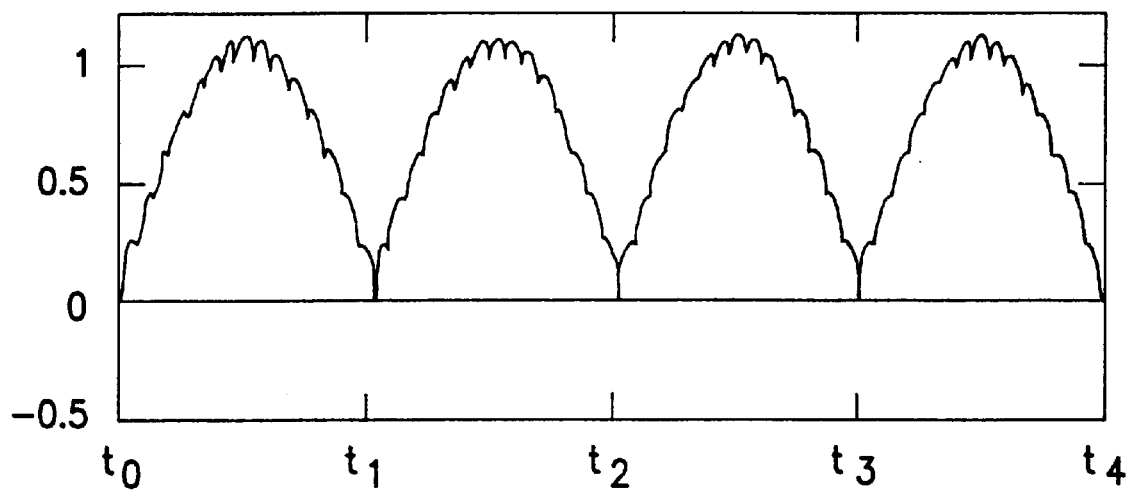
FIG. 11d shows the signal which results from filtering of the signal of FIG. 11c.

The lines 66 carry the raw amplitude-modulated output signal shown in FIG. 11b, and they are coupled to a rectification circuit 68 which may be a full-wave bridge rectifier or any other conventional rectification circuit which provides rectification of the AC output into DC. The output of the rectification circuit (FIG. 11c) may optionally be coupled to an inductor 70 and a capacitor 72 which filter the output of the rectifier into the signal shown in FIG. 11d.

Figure 11E:
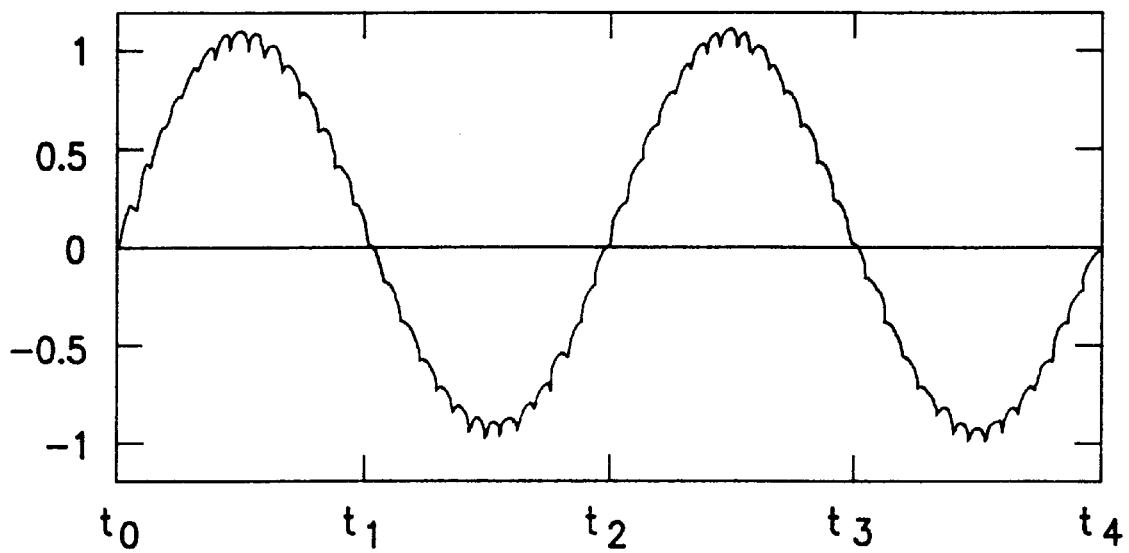

The signal is then processed by a network of switching elements which include an H-bridge 74 formed by semiconductor switches 76, 78, 80, and 82. This bridge 74 reverses alternate half-waves in the signal to provide the alternating current output signal shown in FIG. 11e.

Switches 76 and 78 are coupled together in series, as are switches 80 and 82. The two switch pairs are each coupled in parallel to capacitor 72. Each switch pair provides an output at a node formed between the two switches, such that pair 76/78 provides output terminal 84, while pair 80/82 provides output terminal 86. A load 88 is typically coupled across output terminals 84 and 86 and an additional feedback line 89 is provided from load 88 to a control circuit 90 for the actuator coils. The switches 76, 78, 80, and 82 are thyristors, often called silicon-controlled rectifiers ("SCRs"), but they may alternately be any type of high-power semiconductor switch, such as a MOSFET or an IGBT (insulated gate bipolar transistor).

Figure 12:
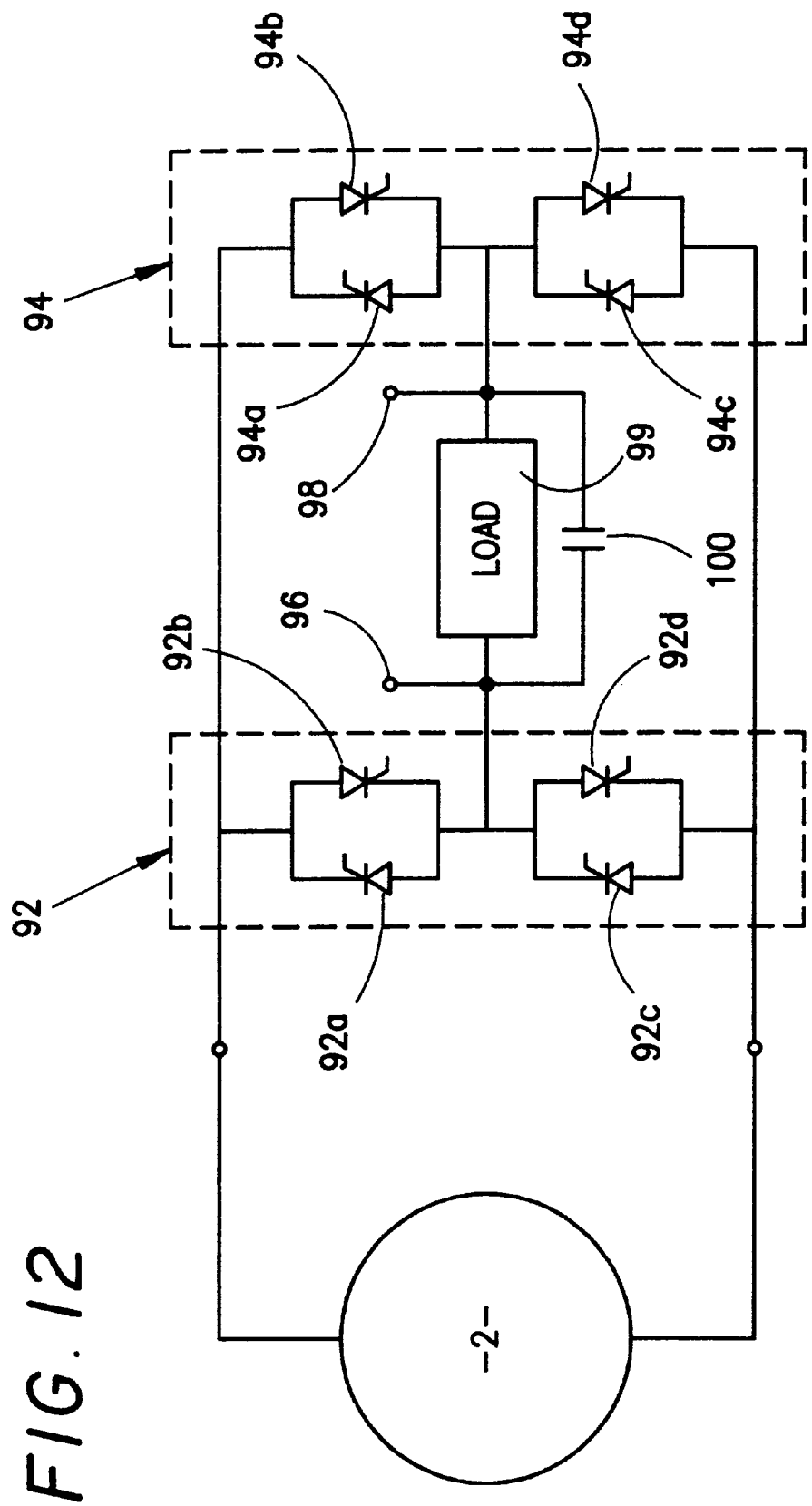
FIG. 12 shows another circuit for processing a raw signal produced by the apparatus of FIG. 2 when its actuator coils are energized by an AC source which imparts to the generator output coils a mechanical oscillation having a frequency corresponding to that of the desired output frequency.

FIG. 12 shows a presently preferred system for processing the raw generator output signal according to the present invention. In this circuit, the output from the generator is fed to an H-bridge which has two legs, 92, 94 each of which includes four SCRs. The SCRs in leg 92 are identified by the reference numerals 92a, 92b, 92c and 92d; and the SCRs in leg 94 are identified by the reference numerals 94a, 94b, 94c, and 94d. The inputs to both legs are connected to a generator output terminal, and the output of each bridge leg is connected to one of the output terminals 96, 98 to which the load 99 is connected. The SCRs are turned off and on at appropriate times to convert the high frequency generator output signal to a lower frequency signal which is suitable for practical high power applications, i.e. applications which involve 10 kilowatts or more.

Figure 13A:
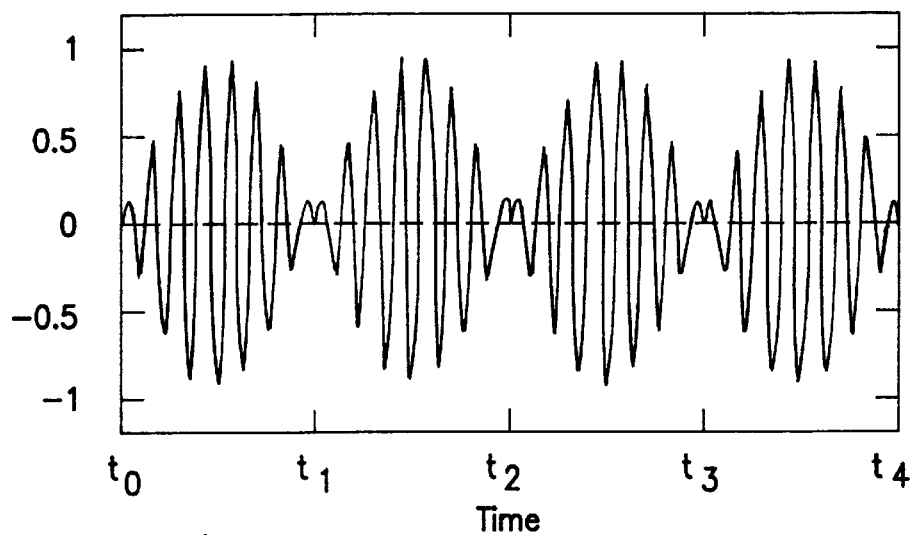
FIG. 13a shows the output signal of the generator and the input signal of the circuit of FIG. 12.

The generator output which is also the signal processor input is shown in FIG. 13a where it will be seen that its carrier frequency is constant and is a function of the rotational speed of the generator. The amplitude of the signal shown in FIG. 13a varies as a function of the displacement of the generator's output coil assembly, as previously explained. Lower peak voltages are generated when the loop assembly is near its null flux position, and maximum positive and negative peak voltages are generated when the loop assembly is at its maximum displacements from the null flux position.

Figure 13B:
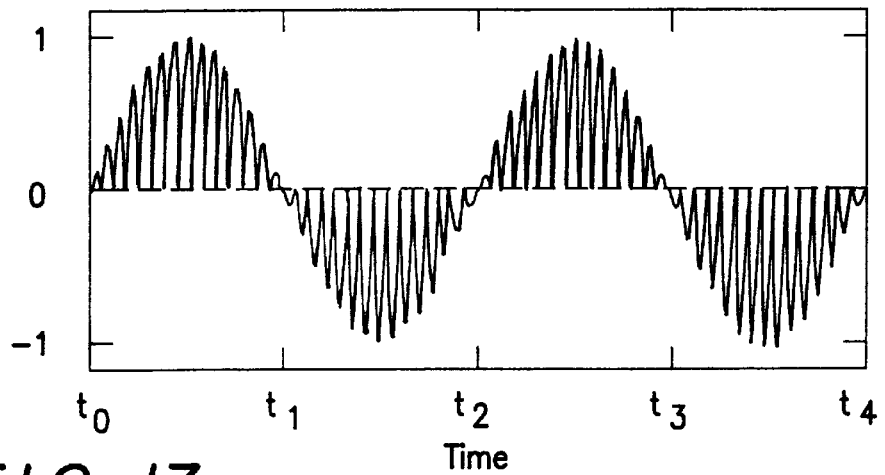
FIG. 13b shows an unfiltered signal produced at the output terminals of the H-bridge in the circuit of FIG. 12.

The SCRs in the H-bridge legs 92, 94 are turned on and off to convert the raw generator output signal shown in FIG. 13a to the signal shown in FIG. 13b. More specifically, the state of the H-bridge is changed whenever the raw generator output signal has a zero voltage. Between times $t_0$ and $t_1$, only SCRs 92c and 94a are on during negative excursions, and only SCRs 92b and 94d are on during positive excursions. Thus, as can be seen in FIG. 13b, the positive excursions remain positive, and the negative excursions are inverted and thus become positive. Conversely, between times $t_1$ and $t_2$, the positive excursions are inverted to become negative, and the negative excursions remain negative. To achieve this result during this time interval, only SCRs 92a and 94c are on during negative excursions, and only SCRs 92d and 94b are on during positive excursions. From $t_2$ to $t_3$, only the negative excursions are inverted, and from $t_3$ to $t_4$, only the positive excursions are inverted, thus providing the signal which is shown in FIG. 13b. Because the SCRs are switched on and off when the voltages are at or near zero, power losses are low, and electrical noise is minimized.

From time $t_0$ to $t_1$, the peaks of the positive excursions define the positive half of a sine wave. From $t_1$ to $t_2$, the peaks of the negative excursions are approximately in the form of the negative half of a sine wave.

Figure 13C:
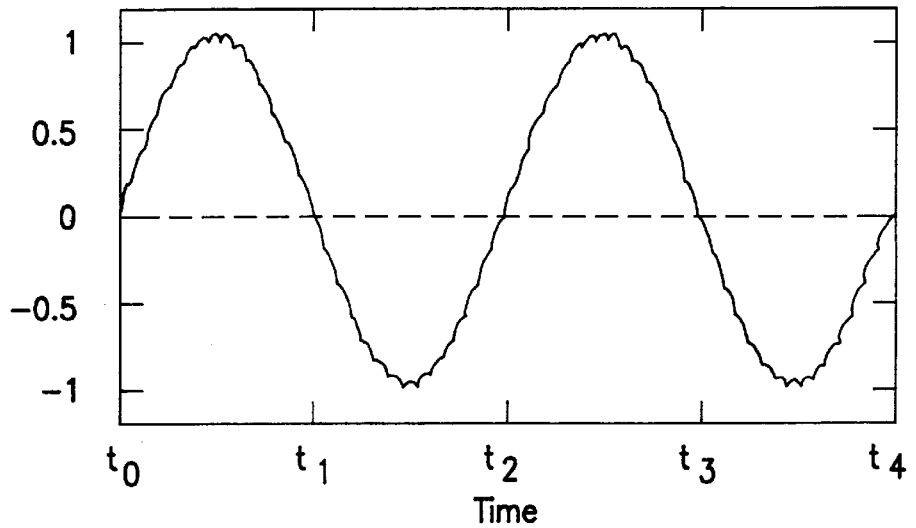
FIG. 13c shows a filtered form of the signals shown in FIG. 13b.

The signal shown in FIG. 13b is preferably filtered by a capacitor 100 (FIG. 12) to smooth the signal to the waveform shown in FIG. 13c. This is substantially a sine wave, the frequency of which is 60 Hz or any other desired output frequency.

The circuits illustrated and described in connection with FIGS. 8, 10 and 12 are suitable for use in connection with the subsequently described embodiments of the invention.

The Second Embodiment

Figure 14:
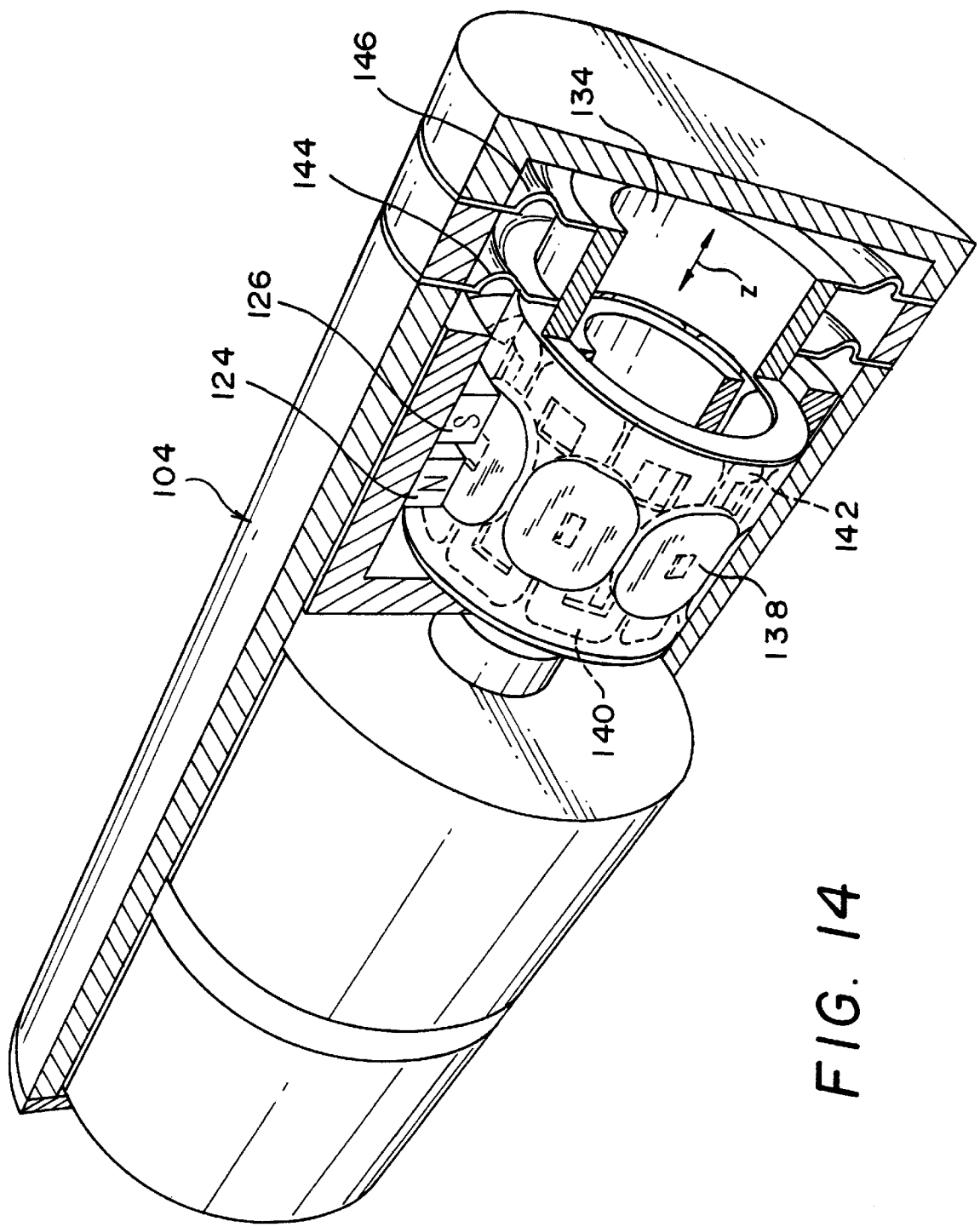
FIG. 14 is a fragmentary perspective view of a second embodiment of the invention in which there is an overlapping relationship between the generator output coils and the actuator coils, and the actuator coils are energized by currents which are induced by the generator field magnets.
Figure 15:
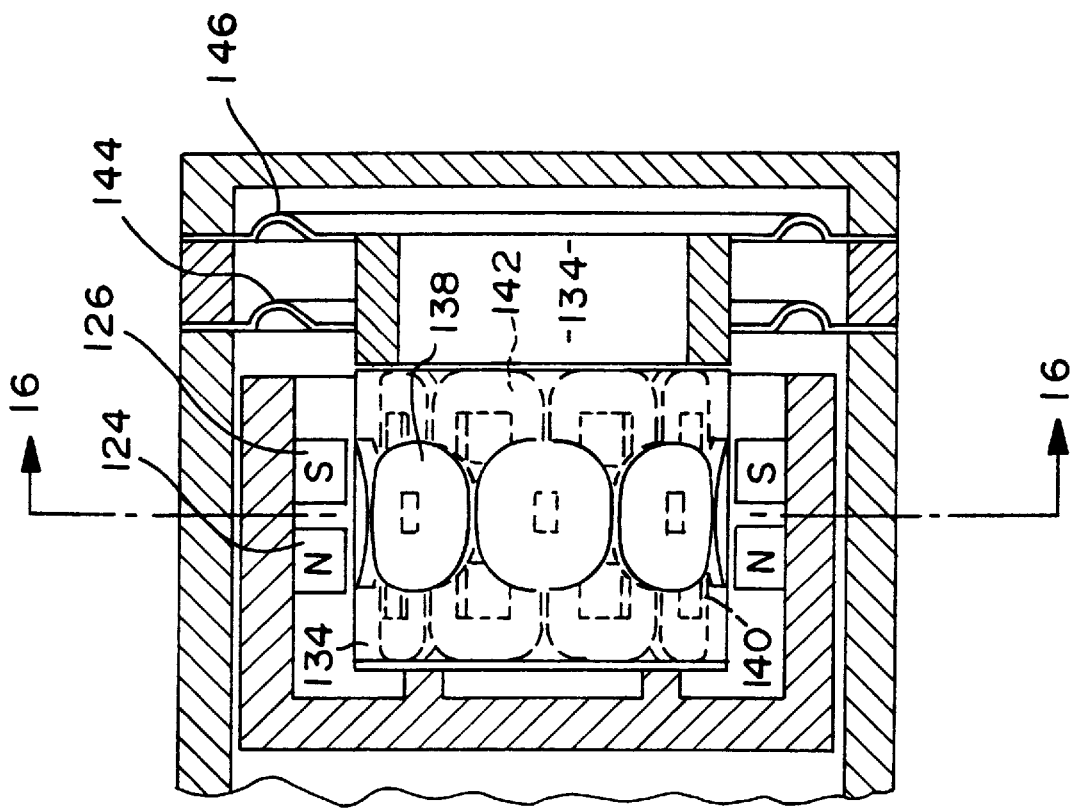
FIG. 15 is a longitudinal sectional view of the generator components of the embodiment of FIG. 14.
Figure 16:
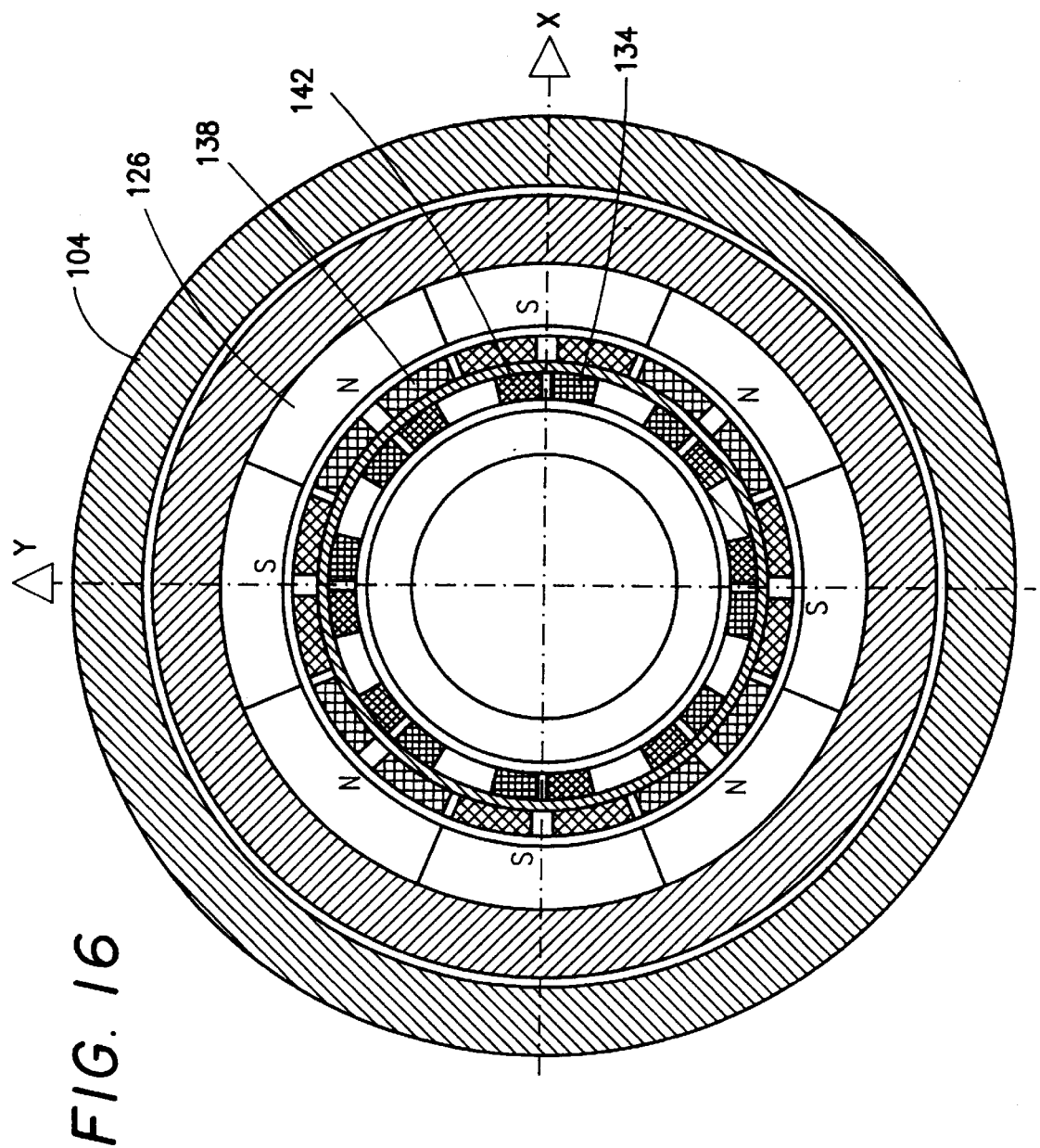
FIG. 16 is a transverse sectional view of the apparatus of FIG. 14, as seen along the section line 16—16 in FIG. 15.

In the embodiment of FIGS. 14–16, the positions and functions of the generator output coils and generator field magnets are substantially the same as in FIG. 2. There are two rings 124 and 126 of generator field magnets which are the same as magnet rings 24 and 26 in the embodiment of FIG. 2. Generator output coils 138 are embedded in the mounting cylinder 134 and they are moved in an axial displacement path z. The mounting cylinder 134 is supported on the housing 104 by two diaphragms 144 and 146. The diaphragms are axially flexible, so that the mounting cylinder 134 and the coils 138 are axially movable to change the proportional extent to which the coils 138 are exposed to the magnetic fields from the two rings 124 and 126 of generator magnets.

The axial movement of the generator output coils 138 and the mounting cylinder in this embodiment is produced by controlling actuator coils which are embedded in the mounting cylinder as shown in FIG. 16. There are two rings 140 and 142 of these actuator coils. Each ring consists of eight coils which occupy about forty-five degrees of the circumference of the mounting cylinder 134. The cylinder 134 is moved axially by controlling the flow of current which is induced in the coils in rings 140 and 142 by the rotating magnetic fields. As can be seen in FIG. 14, each coil in ring 140 is located in the fields emanating from the magnet ring 124, and each coil in ring 142 is located in the fields from the magnet ring 126. The coils in ring 140 are connected together in series or parallel, and there are two leads (not shown) from the ring. A solid state switch (not shown) connects these leads. The coils in ring 142 are connected similarly and their leads are connected by another solid state switch. The rotating magnetic fields induce voltages in the coils in rings 140 and 142, but when the switches are open, no current can flow through the coils in the respective ring so no axial displacement forces are exerted on the mounting cylinder 134. However, when the switch associated with ring 140 is closed, the induced voltage will cause current to flow through the coils in ring 140. Due to the presence of these current-carrying coils in the magnetic fields from magnet ring 124, Lorentz forces will be exerted on the mounting cylinder 134 to move it and the ring of generator coils 138 in an axial direction to the left in FIG. 14. This principle is more fully explained in U.S. Pat. No. 5,469,006 which is incorporated herein by reference. By closing the position control switch associated with the actuator coils in ring 142, the mounting cylinder will move in an opposite direction to the right.

The Third Embodiment

The apparatus shown in FIGS. 17, 18, 19a, 19b, and 19c has rotating generator field magnets and axially movable generator output coils which are similar to the previously-described embodiments. However, in FIG. 17, the actuator coils and the generator coils are arranged to minimize vibrations, reduce the power required to energize the actuator coils, and minimize total axial length of the generator.

Figure 17:
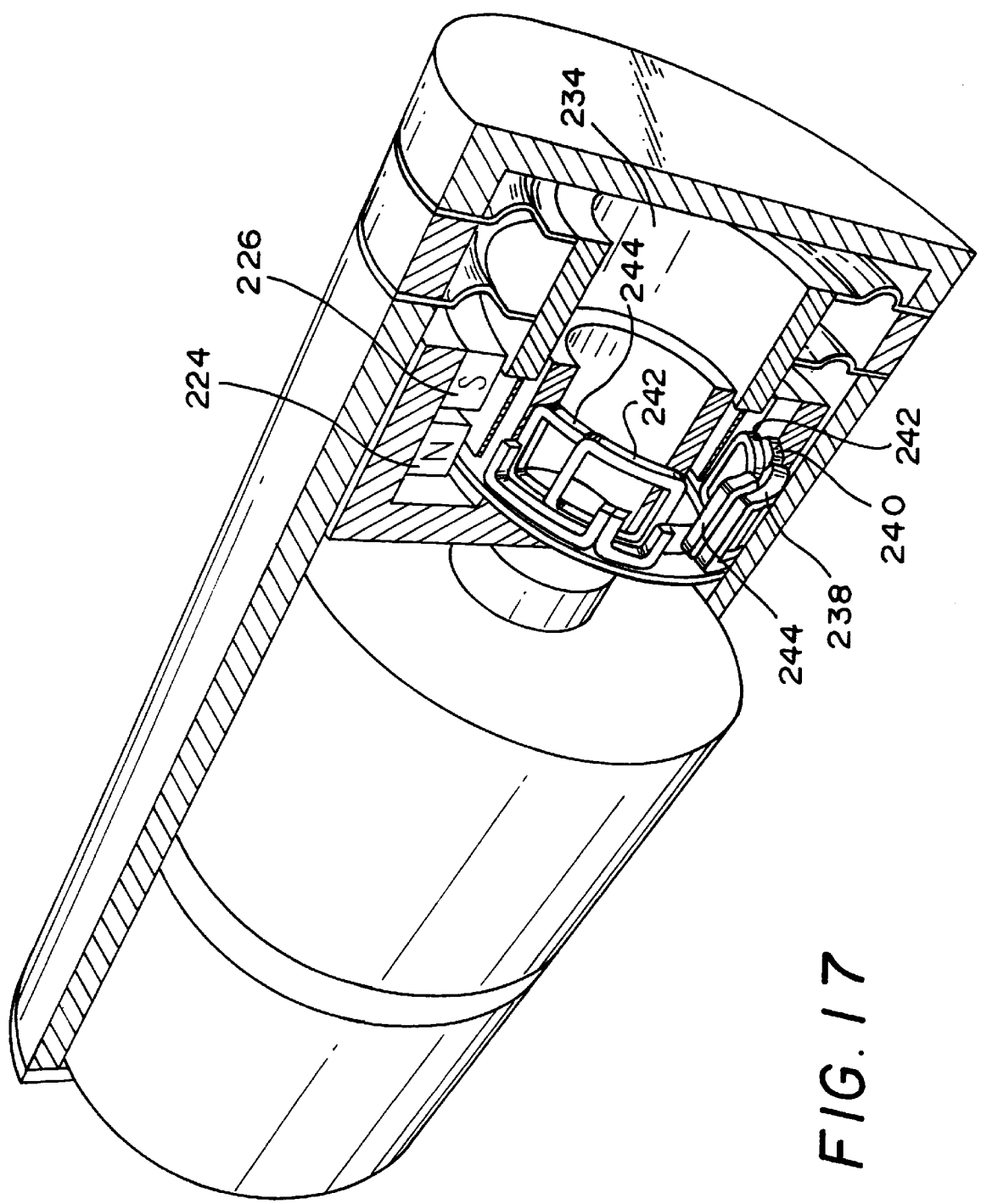
FIG. 17 is a fragmentary perspective view of a third embodiment of the invention in which the actuator coils and generator coils are arranged in two rings on a single cylinder.
Figure 18:
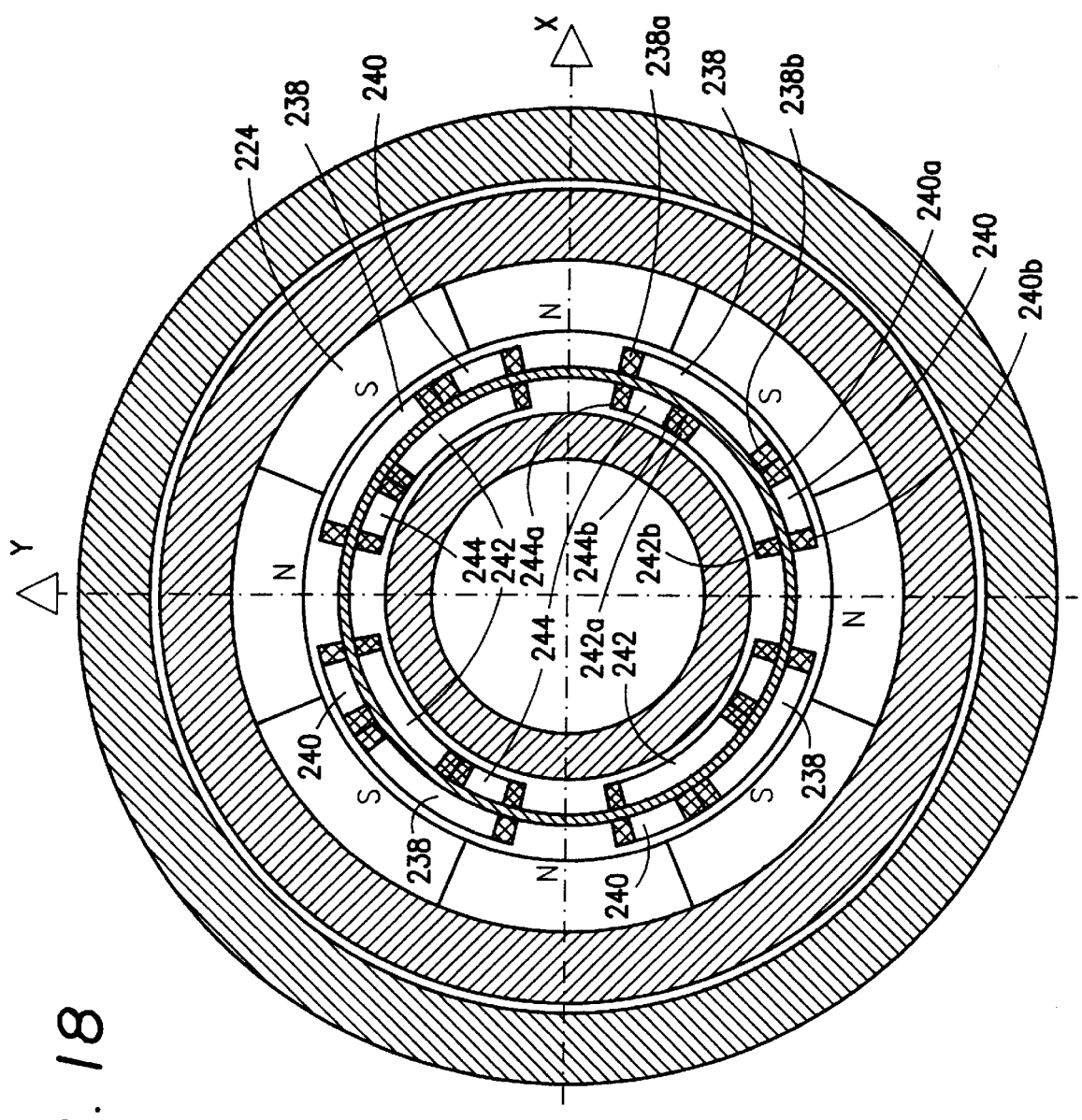
FIG. 18 is a transverse sectional view of the apparatus of FIG. 17.

As shown in FIG. 17, there are two rotating magnet rings 224 and 226. Each magnet has a polarity which is opposite to the magnets which are axially and circumferentially adjacent to it. Four sets of coils, each having four coils, are embedded in the mounting cylinder 234. Each of these sets lies within ninety degrees of the circumference of the mounting cylinder 234. As shown in FIG. 18, each of these sets includes a large outer generator coil 238 with axial legs 238a and 238b, a small outer actuator coil 240 with axial legs 240a and 240b, a large inner generator coil 242 with axial legs 242a and 242b, and a small inner actuator coil 244 with axial legs 244a and 244b.

The coils on member 234 are arranged to form inner and outer output/actuator rings. The outer output/actuator ring includes the ring of output coils 238 and the ring of actuator coils 240. These rings have equal diameters, and the actuator coils 240 are located between the output loops 238. The inner output/actuator ring is formed of equal diameter rings of output coils 242 and actuator coils 244. The inner and outer actuator coils 238 and 242 partially overlap each other, but there is no overlap between the actuator coils 240 and 244.

Figure 19A:
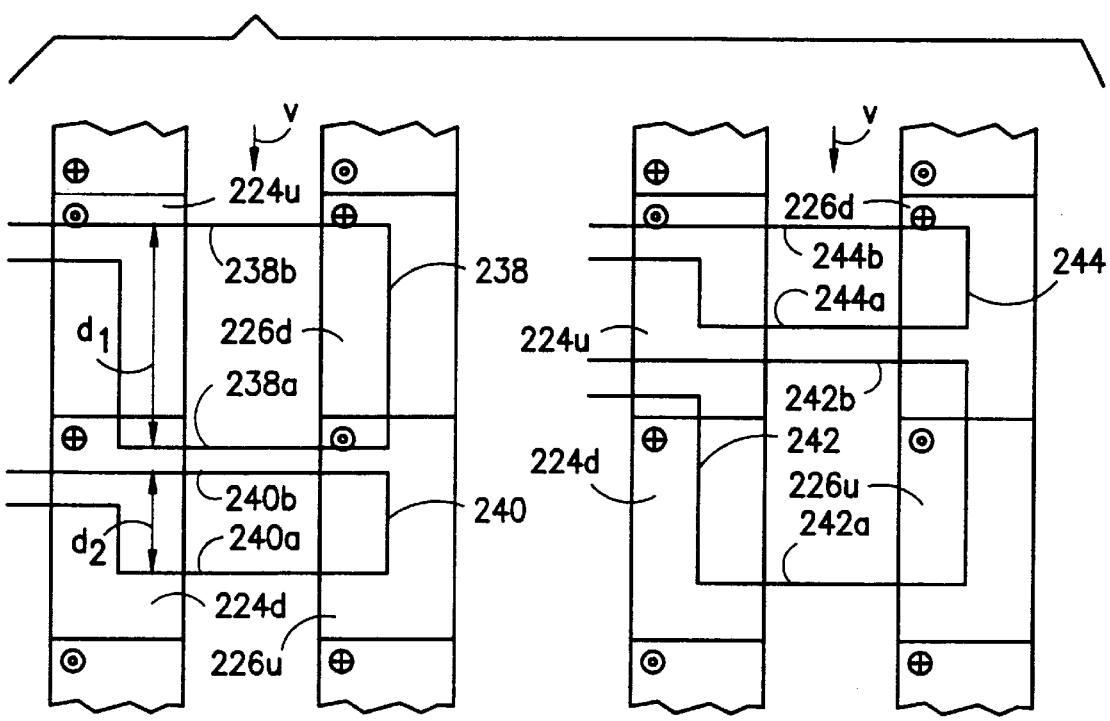
FIGS. 19a, 19b, and 19c are diagrammatic representations which illustrate the principles of operation of the generator of FIG. 17.
Figure 19B:
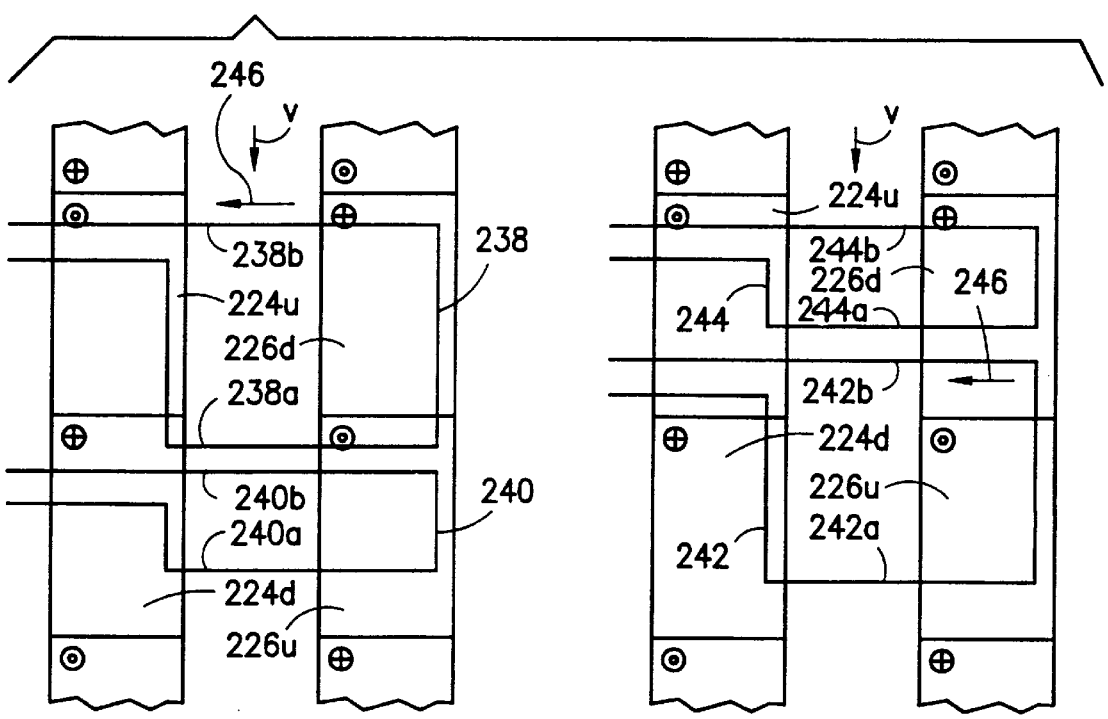
Figure 19C:
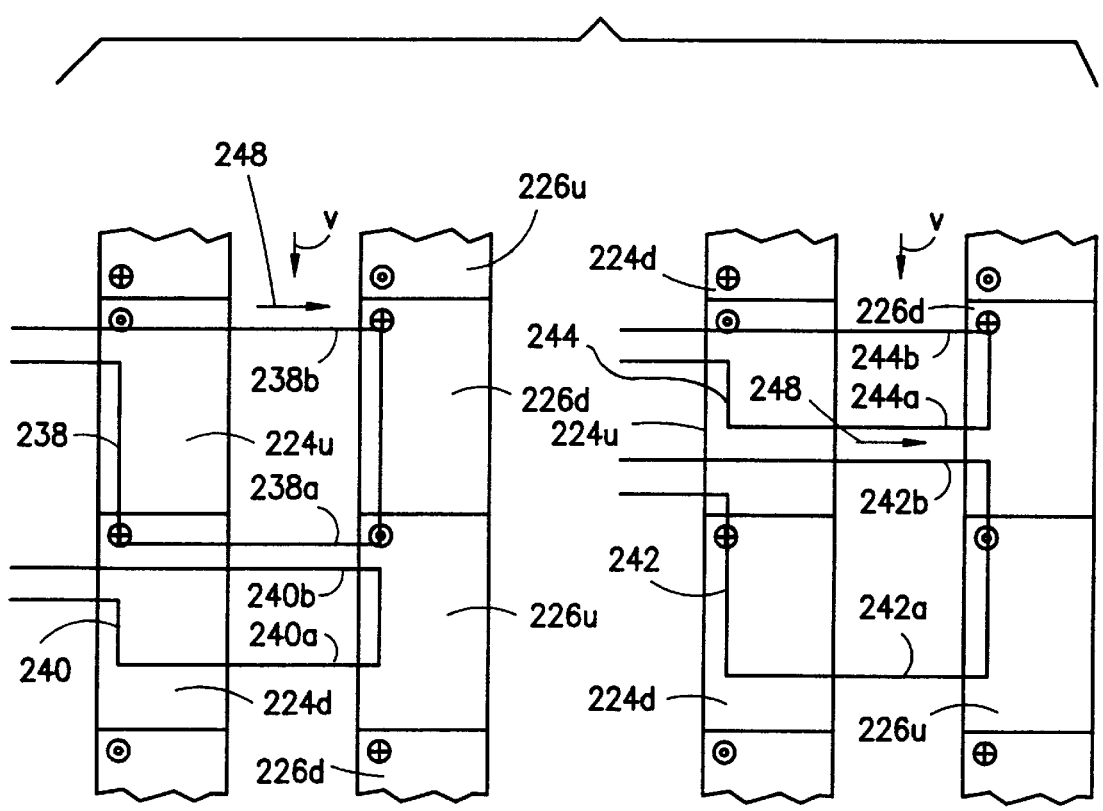

FIGS. 19a, 19b, and 19c show the positions of the four coils in one set when the mounting cylinder 234 is in different positions. In these drawings, the magnetic fields from the left magnet ring 224 are designated $224_u$ and $224_d$, and the fields from the right magnet rings are designated $226_u$ and $226_d$. Fields $224_u$ and $226_u$ are directed up from the plane of the drawings, and fields $224_d$ and $226_d$ are directed down into the plane of the drawings. The magnets and their fields are moving in the direction of arrow v.

FIG. 19a shows the positions of the four coils in one set when the mounting cylinder is in its null flux position. The outer coils and the inner coils are shown side-by-side for illustrative purposes, but it will be understood that they are actually superimposed and are subjected to the same magnetic fields. The circumferential dimension $d_1$ of the large coils 238 and 242 is equal to the circumferential length of a field from a magnet segment, and the circumferential dimension $d_2$ of the small coils 240 and 244 is one-half of $d_1$. Since the coils 242 and 244 are closer to the axis of rotation than coils 238 and 240, their circumferential dimensions are slightly less than those of coils 238 and 240, as can be seen in FIG. 18.

In FIG. 19a, the generator coils are in their null flux position so there is no electrical output. By connecting the actuator coils 240, 244 with a power source providing alternating current which is appropriately phased and directed, the mounting cylinder and the generator coils will be shifted axially to oscillate between the left or right positions shown in FIGS. 19b and 19c. In the right-shifted position shown in FIG. 19b, the coils 238, 240, 242, and 244 will be subjected to more flux from magnet ring 226 than from magnet ring 224. If an electrical load is connected to the generator coils, current will flow in the directions indicated by the arrows 246. In the left-shifted position shown in FIG. 19c, current will flow in the direction indicated by the arrow 248.

If the coils 240 and 244 are energized by direct current, the mounting cylinder 234 and generator output coils 238 and 242 will oscillate because of the alternating magnetic fields encountered by the coils.

A benefit of this embodiment is that the forces resulting from currents in all the generator coils 238 and 242 are almost always in opposite directions, thus balancing axial forces which may tend to cause an unwanted vibration of the coil assemblies.

The Fourth Embodiment

Figure 21:
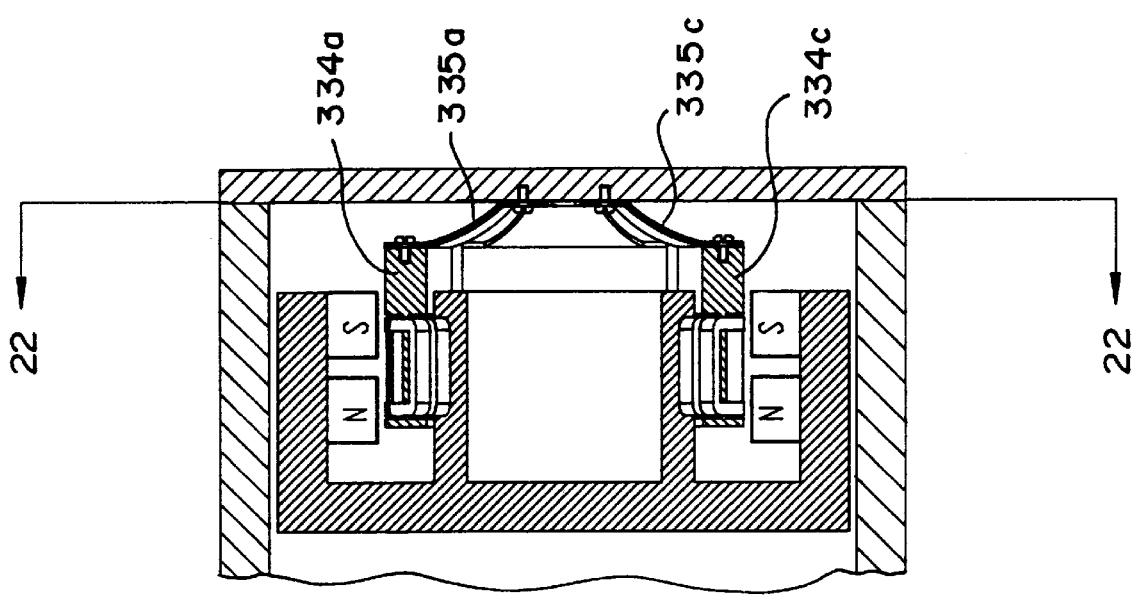
FIG. 21 is a longitudinal sectional view of the generator portions of the apparatus of FIG. 20.
Figure 22:
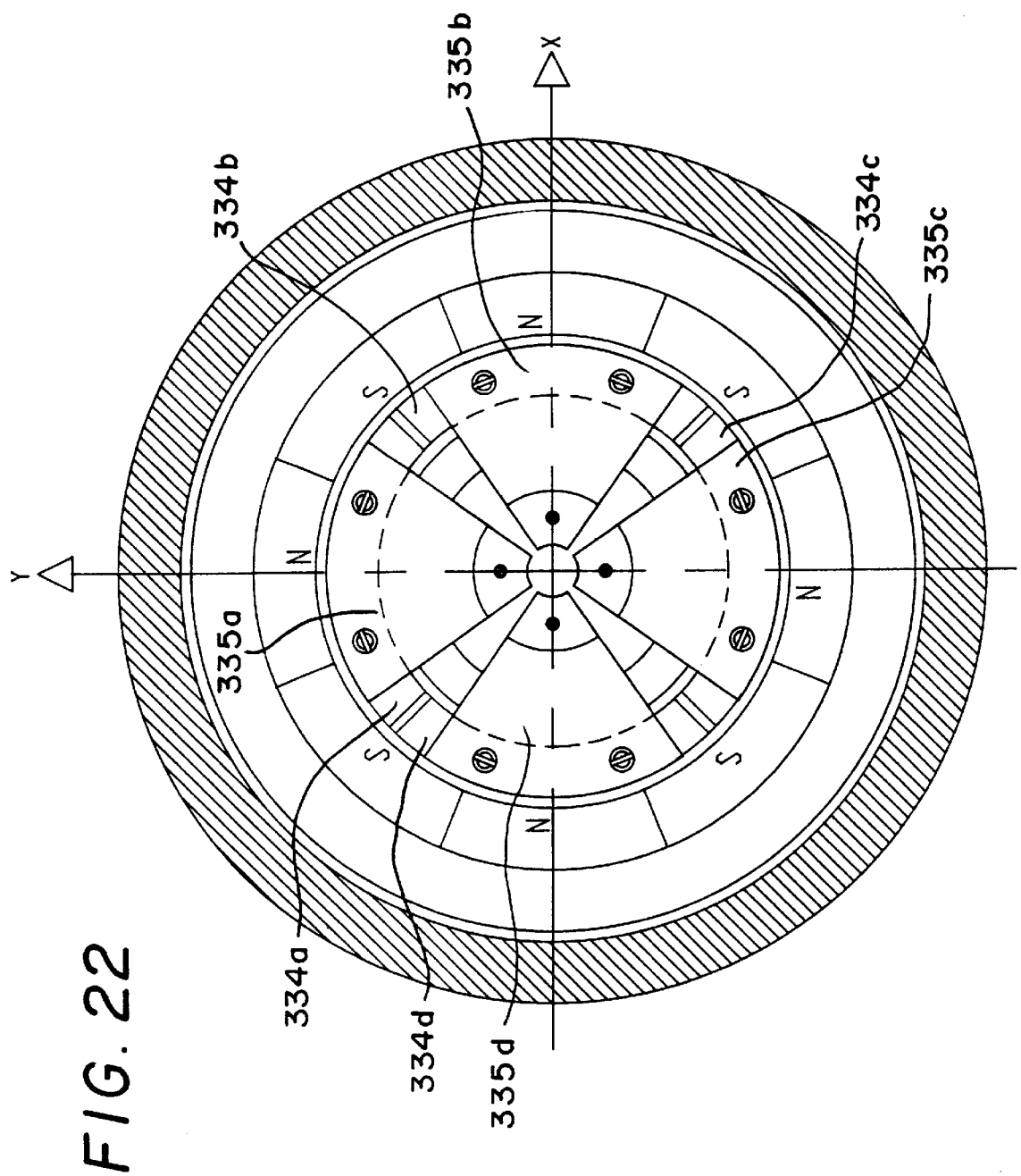
FIG. 22 is a transverse sectional view of the generator of FIG. 20 as seen along the line 22—22 in FIG. 21.

FIGS. 20, 21 and 22 show a modified version of the embodiment shown in FIG. 17. In order to provide four different output channels, the mounting cylinder is longitudinally split into four segments 334a, 334b, 334c, 334d, and each of the four coil assemblies is independently mounted on one of these segments. The cylinder segments are independently supported on flat pieces of spring steel 335a, 335b, 335c, and 335d which enable each segment to be actuated at a frequency, phase and amplitude which is different from the other segments.

The Fifth Embodiment

A unit which generates an output in response to radial rather than axial displacements of the output coils is shown in FIGS. 23–27. As in the previously-described units, a motor 414 rotates a shaft 416, an optional flywheel 417, and a generator magnet assembly 418.

Figure 23:
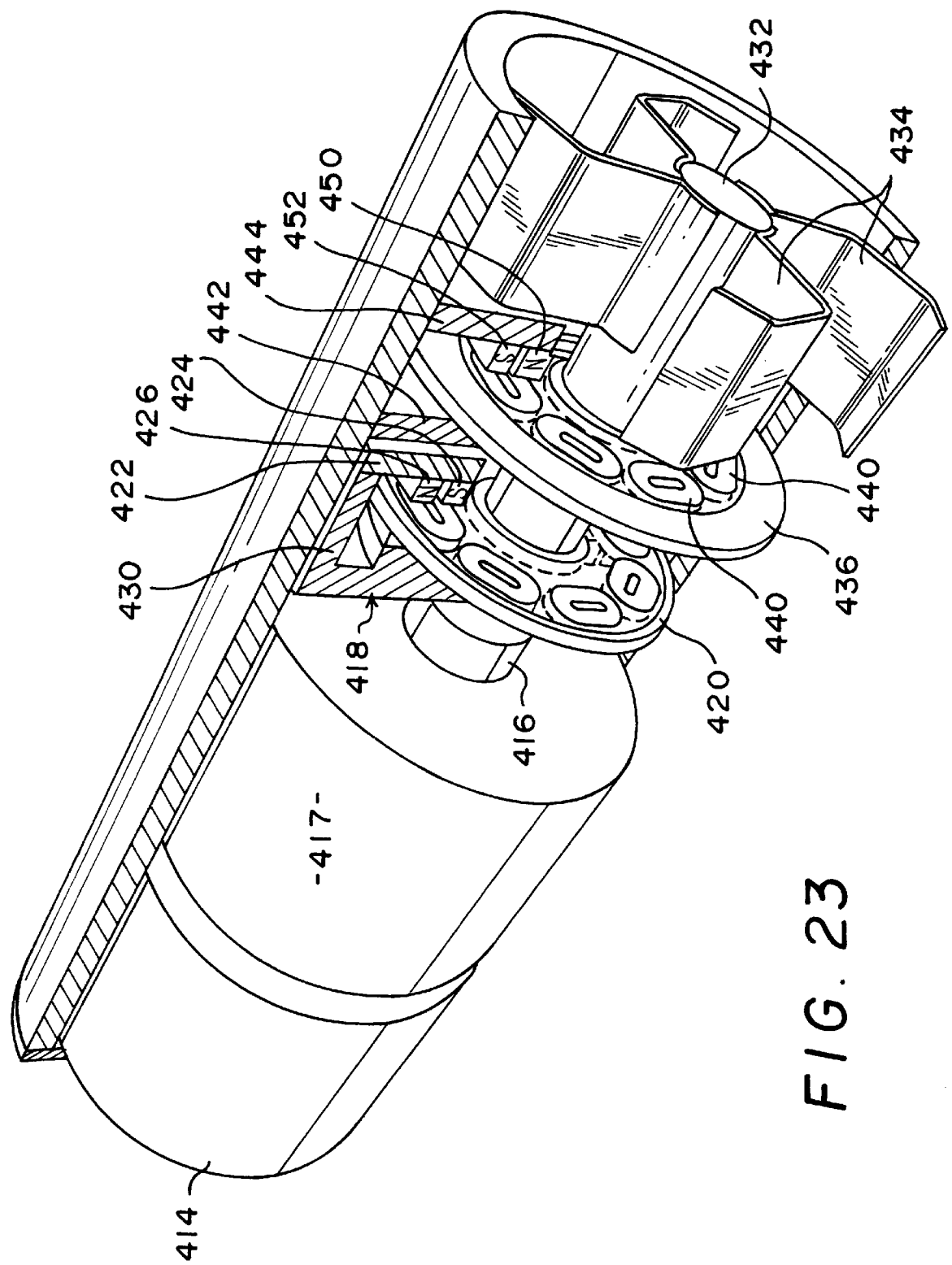
FIG. 23 is a perspective view of a fifth embodiment of the invention in which the generator output coils are movable along radial displacement paths to vary the generator output signal.
Figure 25:
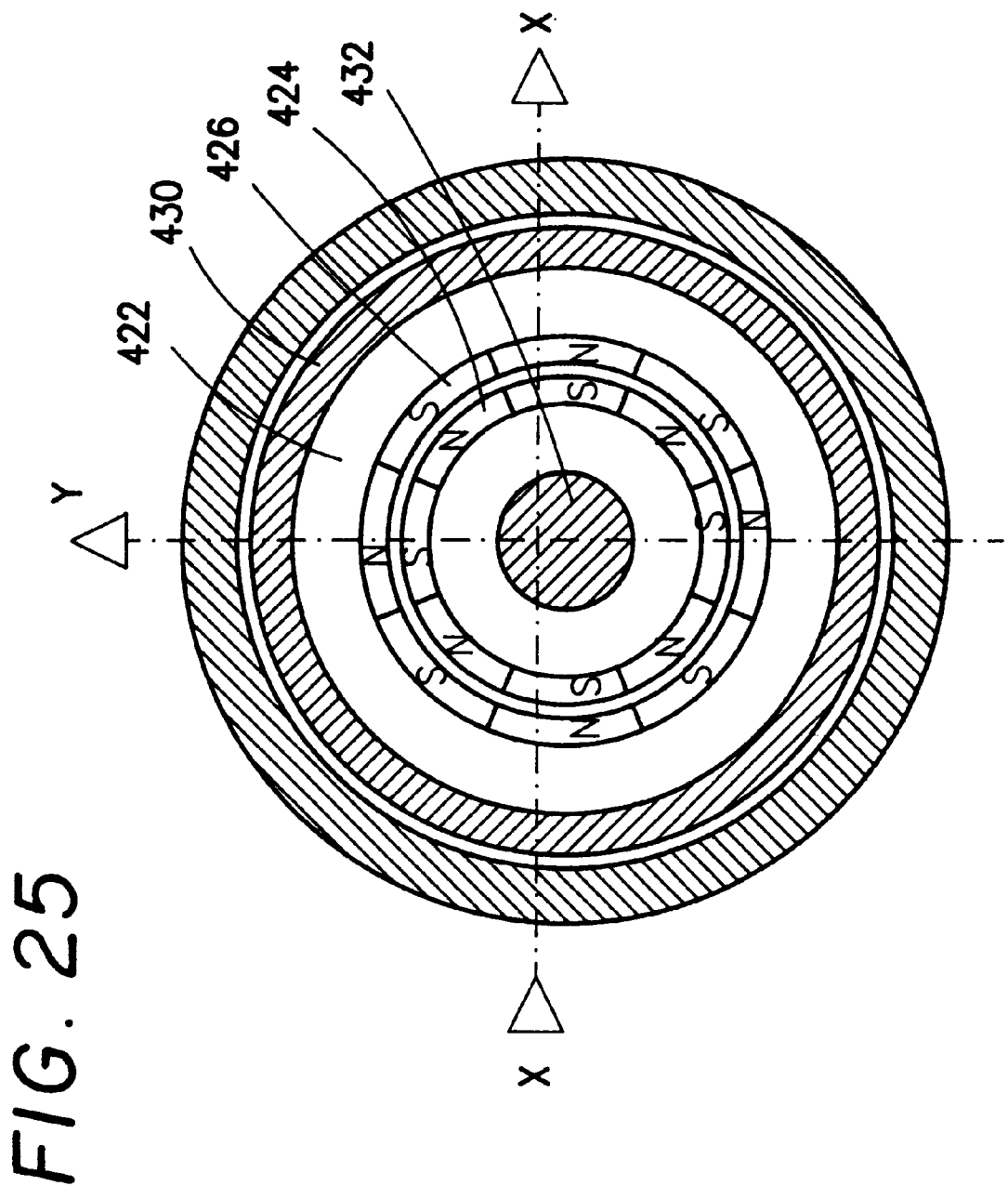
FIG. 25 is a sectional view as seen along the line 25—25 in FIG. 24, showing the arrangement of the generator field magnets.

The generator section of the unit includes the generator magnet assembly 418 and a non-rotatable radially displaceable generator output coil disk 420. As best shown in FIG. 23, the generator magnet assembly 418 includes an annular back iron 422 which carries an inner ring 424 and an outer ring 426 of magnets, a circular back iron 428 which faces toward the disk and carries an inner ring 429 and an outer ring 431 of magnets, and a cylindrical rim portion 430 which connects the back irons 422 and 428. As shown in FIG. 25, the polarities of the magnets in each ring alternate circumferentially and radially. The polarity of each magnet is opposite to that of its adjacent counterpart in the other magnet ring.

The generator output coil disk 420 carries eight coils which are distributed circumferentially in the disk as shown in FIG. 23.

The generator output coils on the disk 420 are located in the gap between the opposed pole faces of the field magnets. The thickness of this gap is less than one-fifth of the distance between the axis of rotation and the center of any of the output coils on the disk 420.

Figure 27:
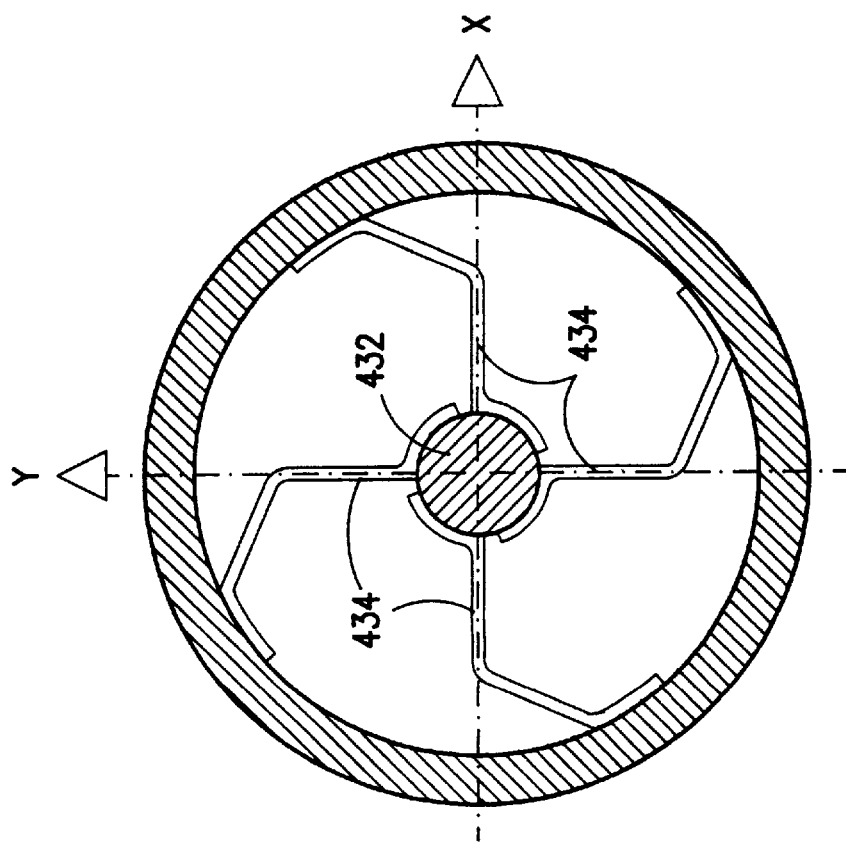
FIG. 27 is a sectional view of the apparatus of FIG. 23 as seen along the line 27—27 in FIG. 24, showing the manner in which the shaft which supports the generator output coils is radially movable.

The disk 420 is nonrotatably supported on a nonrotatable shaft 432 which is supported on the housing by four springs 434. As shown in FIG. 27, these springs normally support the shaft in the position shown in solid lines where its axis is coincident with the rotational axis of the generator field magnet assembly 418, and the coils on the generator coil disk 420 are at a null flux position at which they are exposed equally to the magnetic fields of the inner and outer magnet rings 424, 429, and 426, 431.

Figure 24:
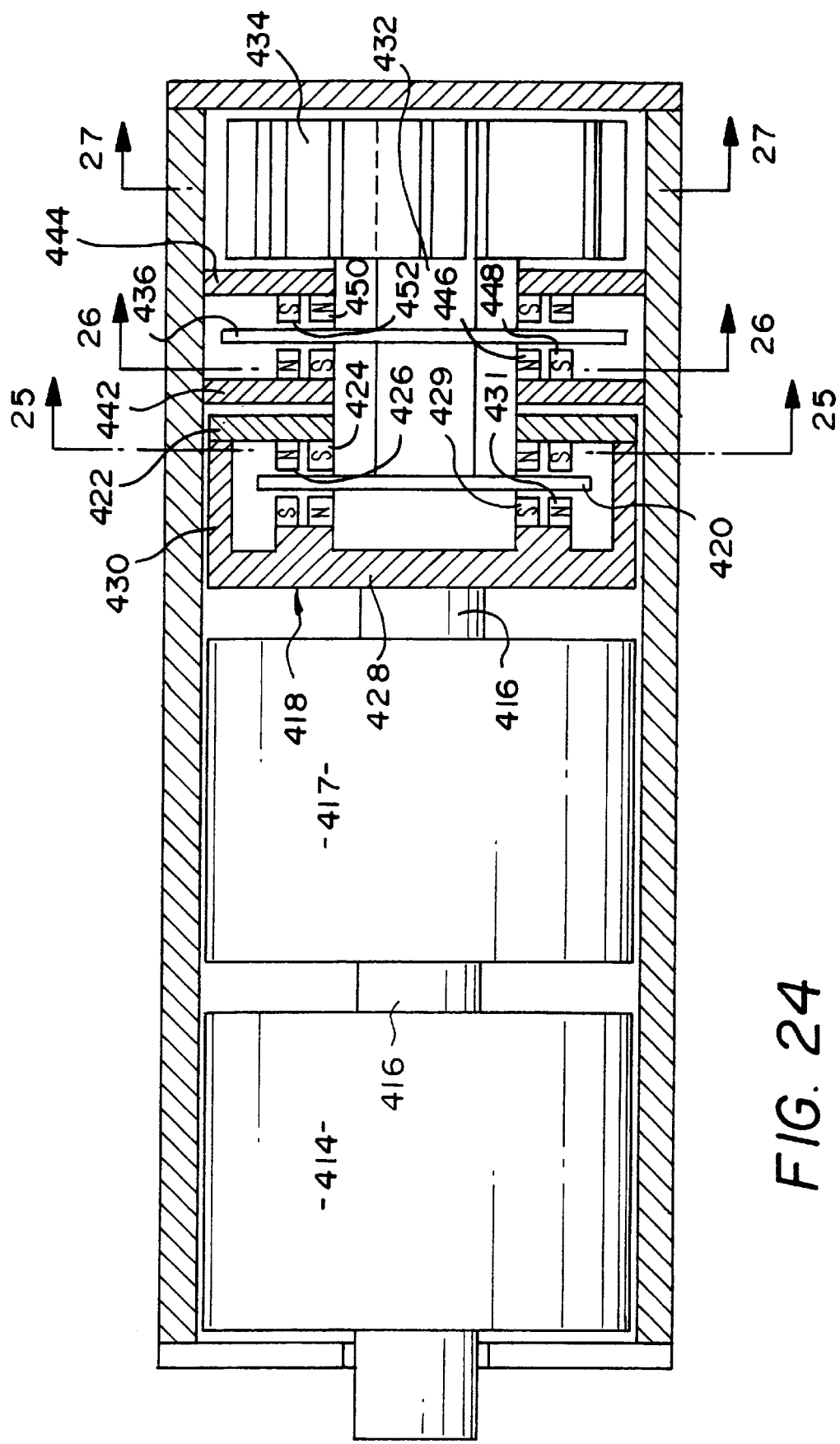
FIG. 24 is a longitudinal sectional view of the apparatus of FIG. 23.
Figure 26:
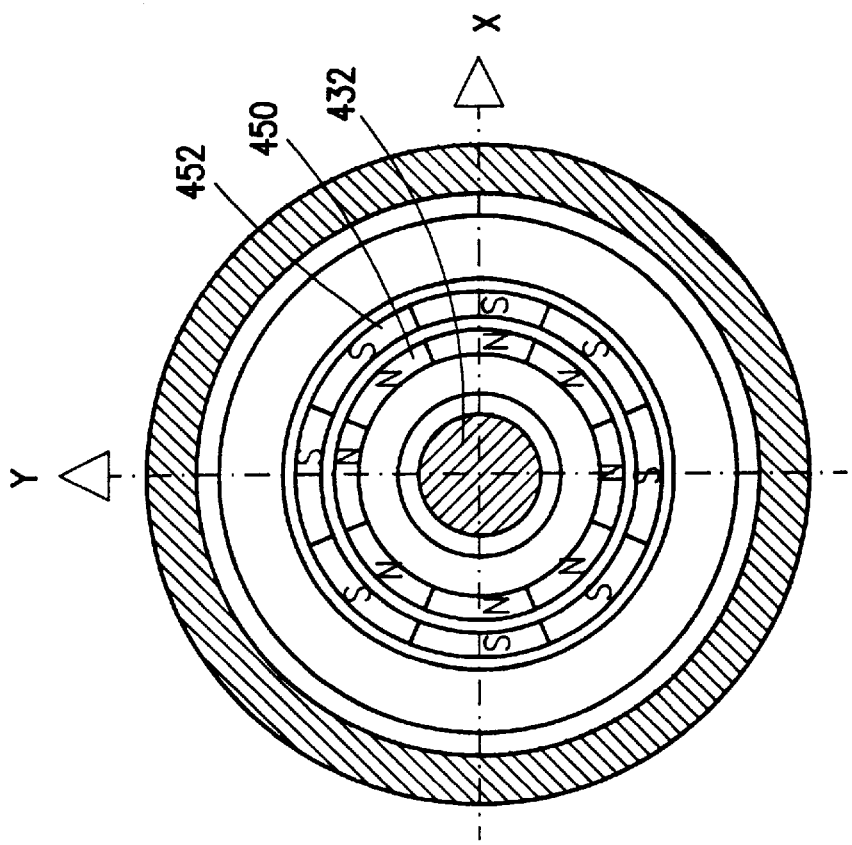
FIG. 26 is a transverse sectional view of the apparatus of FIG. 23 as seen along the section line 26—26 in FIG. 24 showing the arrangement of the magnet rings in the actuator section of this apparatus.

The shaft 432 may be moved in a horizontal radial x-axis direction and/or in a vertical radial y-axis direction by a Lorentz force actuator shown in FIGS. 23, 24, and 26. This actuator includes a non-rotating coil disk 436 and a magnet assembly 438. The actuator coil disk 436 includes eight coils 440 which are distributed circumferentially in the disk 436 as shown in FIG. 23. As best shown in FIG. 24, the actuator magnet assembly has two annular back irons 442 and 444 which are nonrotatably connected to the main housing, and four rings 446, 448, 450, and 452 of magnets. Each ring is formed of eight magnets which are axially polarized. Each magnet has a polarity which is the same as the circumferentially adjacent magnets. The rings 446 and 448 are on opposite sides of the coil disk from the rings 450 and 452. The inner rings 446 and 450 face toward each other, and the outer rings 448 and 452 face toward each other to produce axially directed magnetic fields which pass through the coils 440 on the disk 436. The polarity of each magnet is opposite to the polarities of the magnets which are axially and radially adjacent to it.

The coils 440 of the actuator assembly are selectively connected to a power source. Because these coils are in axially oriented magnetic fields, current flowing through them will produce radially oriented Lorentz forces on the actuator disk 436.

Energizing the upper and lower coils 440 so that currents flow in opposite directions in these coils will produce vertical forces because their inboard and outboard legs are located in oppositely directed magnetic fields. Current flowing through the left and right coils 440 will produce horizontal Lorentz forces.

The Lorentz forces move the actuator disk 436, the shaft 432 and the generator disk 420 in displacement paths which are toward and away from the neutral or null flux position shown in solid lines in FIG. 27. A displaced position is shown in dotted lines in FIG. 27. When the disk is displaced from its neutral position, the magnetic fields from the generator magnet assembly 438 will induce voltages in the coils on disk 420 so that current will flow in these coils when they are connected to a load.

The Sixth Embodiment

Figure 29:
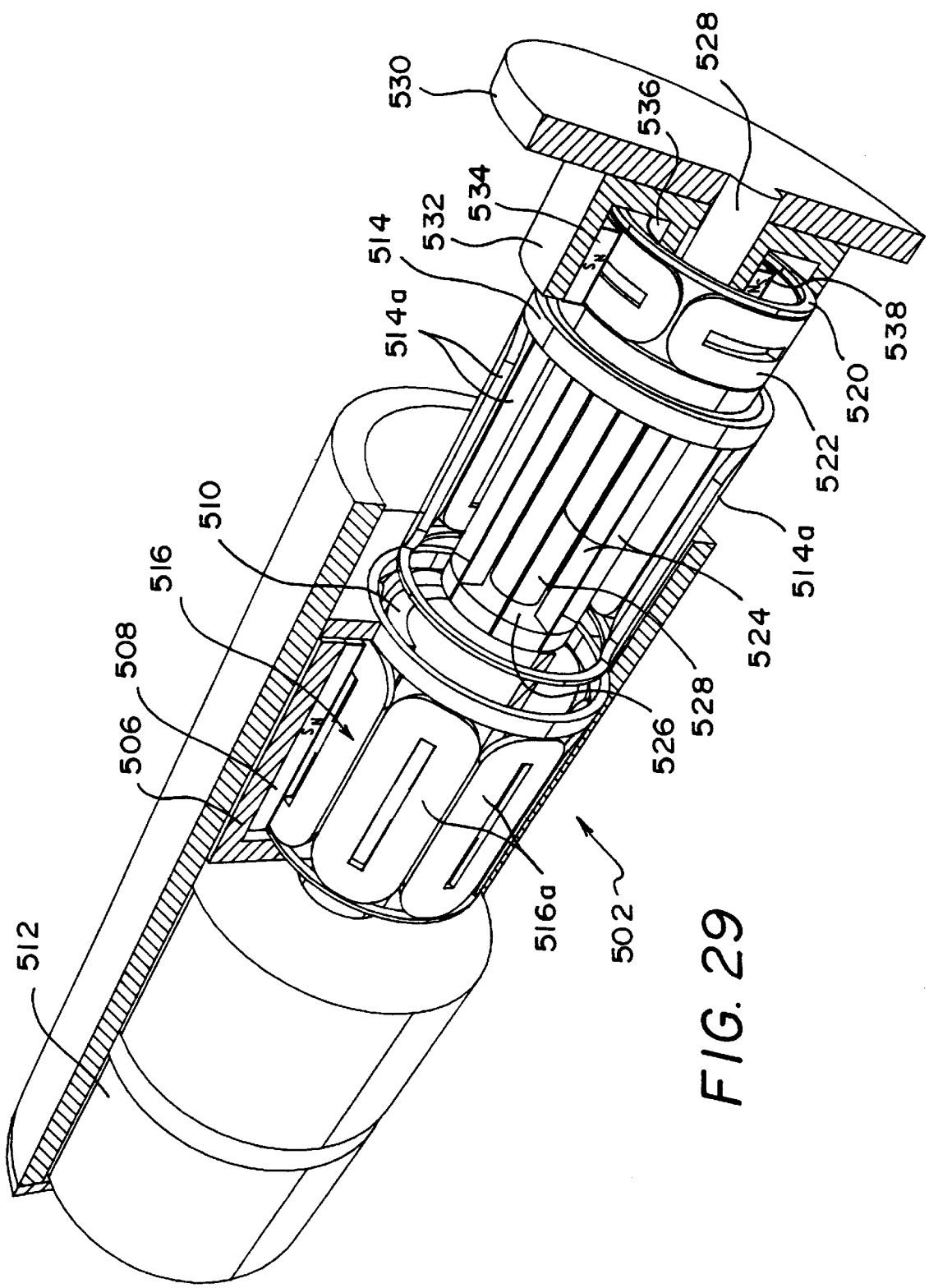
FIG. 29 is an exploded version of FIG. 28, showing the inner cylinder of generator output coils and the supports for this cylinder.
Figure 30:
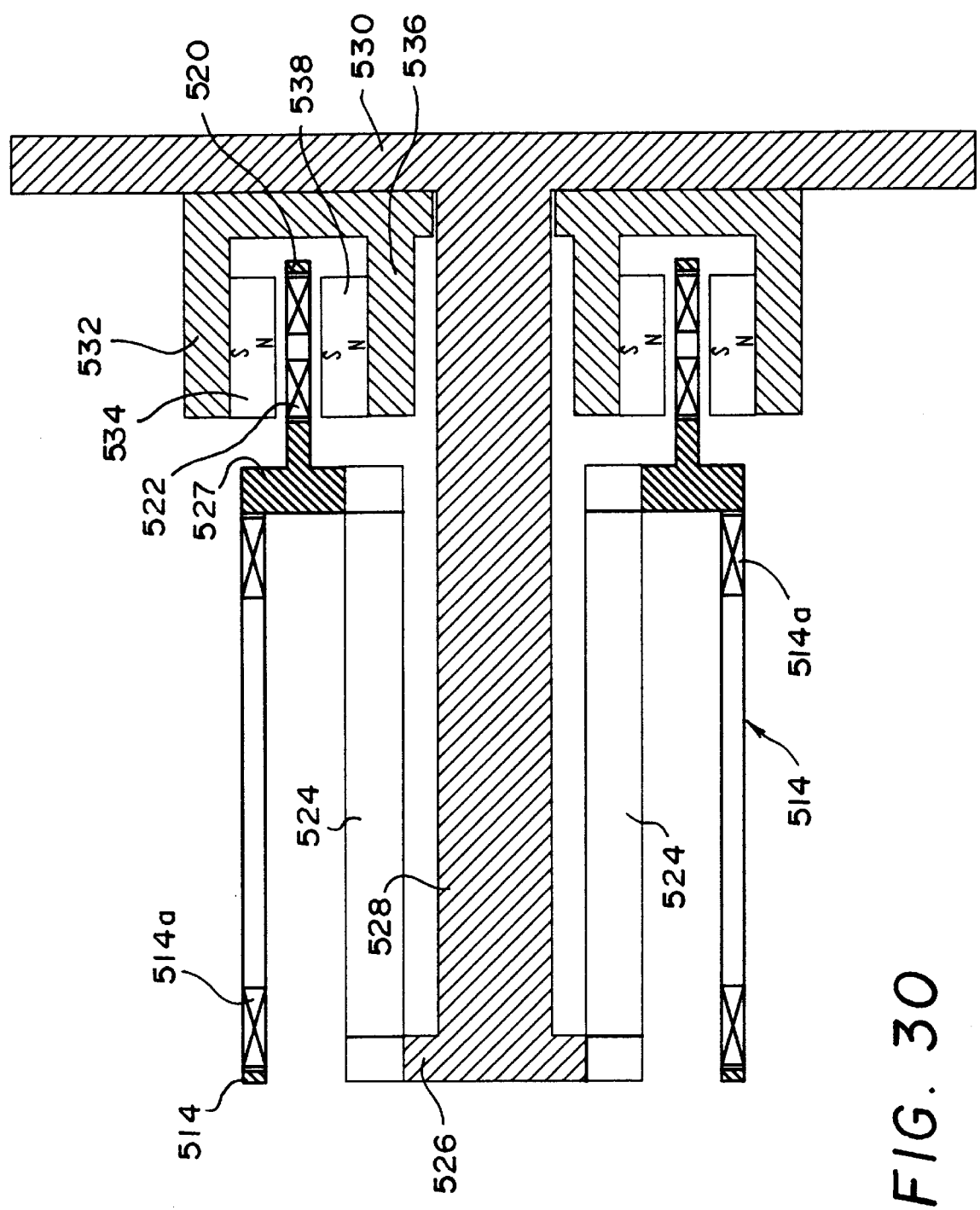
FIG. 30 is a longitudinal sectional view of the apparatus of FIG. 28, showing the structure which supports the actuator coils and the inner cylinder of generator output coils.
Figures 31, 32:
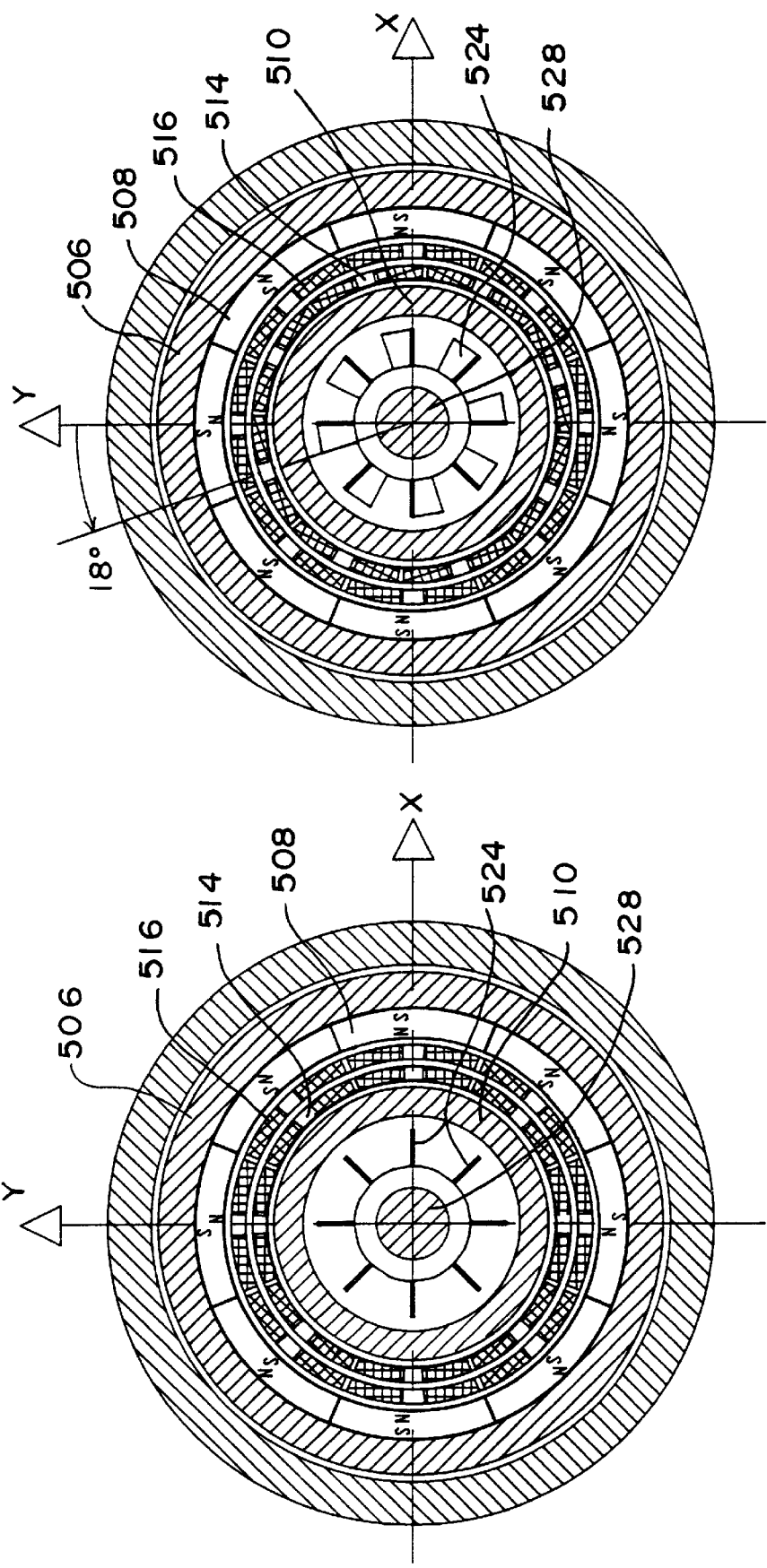
FIG. 31 is a transverse sectional view of the apparatus of FIG. 28 when the generator output coils are relatively positioned in their null flux position.
FIG. 32 is a view similar to FIG. 31, but showing the inner cylinder of generator output coils in an angularly shifted position.

The embodiment of FIGS. 28–34 has two sets of generator output coils, one of which is movable relative to the other in an angular or circumferential displacement path. This apparatus has a generator section 502 and an actuator section 504. The generator section 502 includes a rotating outer back iron cylinder 506, a ring of radially polarized inwardly facing field magnets 508 mounted on the outer back iron 506, and an inner back iron cylinder 510 (FIG. 29). The prime mover 512 rotates the components 506, 508, and 510. As shown in FIG. 31, the polarities of the field magnets 508 alternate circumferentially.

In the gap which is the cylindrical volume defined by the exterior surface of the back iron cylinder 510 and the inwardly facing pole surfaces of the field magnets 508, there is an output loop assembly which includes an inner output coil cylinder 514 and an outer output coil cylinder 516, each of which has eight generator output coils in it. A ring of coils 514a is on the inner cylinder 514 as shown in FIGS. 29, 31, and 32, and a ring of coils 516a is on the outer cylinder 516. The outer cylinder 516 is not angularly movable, and it is supported on the housing by flange 519. The inner cylinder 514 is supported for limited angular movement to vary the phasing between the coils on the inner and outer cylinders. This angular movement is the displacement movement of the loop assembly in this embodiment and, although it moves only a portion of the loops of the loop assembly, it is effective to change the position of the output loops with respect to the magnetic fields. As in the preceding embodiments, this change is independent of the relative rotation between the magnet assembly and the loop assembly.

The inner cylinder 514 can rotate about ±22.5° (total of 45° which is one magnet length) from the neutral position shown in FIG. 31 at which its coils are aligned with those of the outer cylinder 516. An angular displacement of eighteen degrees is shown in FIG. 32.

As illustrated in FIGS. 29 and 30, the inner generator coil cylinder 514 is rigidly connected to and is angularly displaced with a cylinder 520 which carries the coils 522 of the actuator section 504. The coils 522 can be connected together in series or in parallel. These cylinders 514 and 520 are connected together by a disk 527 and they are supported by a set of eight axially extending resilient spring steel blades 524 which are parallel to and circumferentially spaced from each other. The opposite ends of the blades 524 are axially spaced from each other. Each blade has a stationary end affixed to a stationary disk 526 and a movable end which is affixed to the disk 527 which is angularly movable in the angular direction of the displacement path.

The disk 526 is supported on a nonrotating shaft 528 mounted on the end plate 530 of the main housing of the unit. The resilient spring blades bias the output loop assembly angularly toward the neutral or null flux position shown in FIG. 31.

The actuator 504 includes a stationary outer back iron cylinder 532 which carries a ring 534 of eight inwardly facing magnets and a stationary inner back iron cylinder 536 which carries a ring 538 of eight outwardly facing magnets. Each magnet has a polarity which is opposite to that of the magnets which are circumferentially and radially adjacent to it. The actuator coil cylinder 520 is positioned between the inner and outer rings 534 and 538 of magnets as shown in FIG. 30, so the coils 522 will be in the magnetic fields established by the magnets.

A power source is connected to the actuator cylinder coils 522. When current flows through these coils, the cylinder 520 will be subjected to Lorentz forces which impart limited motion in a rotary displacement path to the actuator cylinder 520 and the attached cylinder 514 which carries the inner generator output coils 514a. This movement causes the generator output coils to move toward and away from the null flux position which exists when the coils 514a and 516a are not aligned in the illustrated embodiment, so a voltage is induced in the output coils by the rotating magnetic fields.

Figure 33A:
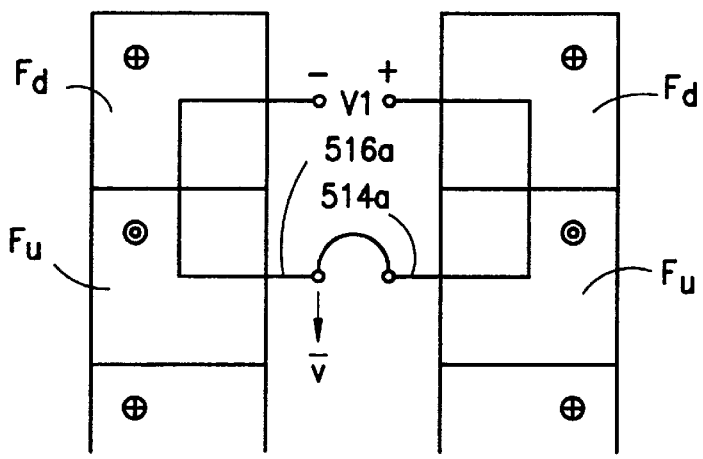
FIGS. 33a, 33b, and 33c are diagrams which illustrate the effect of angular displacement of the coils in the generator of FIG. 28.
Figure 33B:
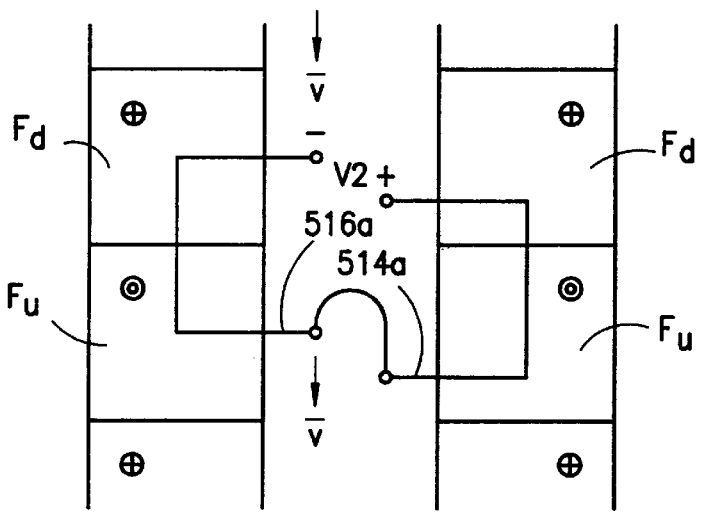
Figure 33C:
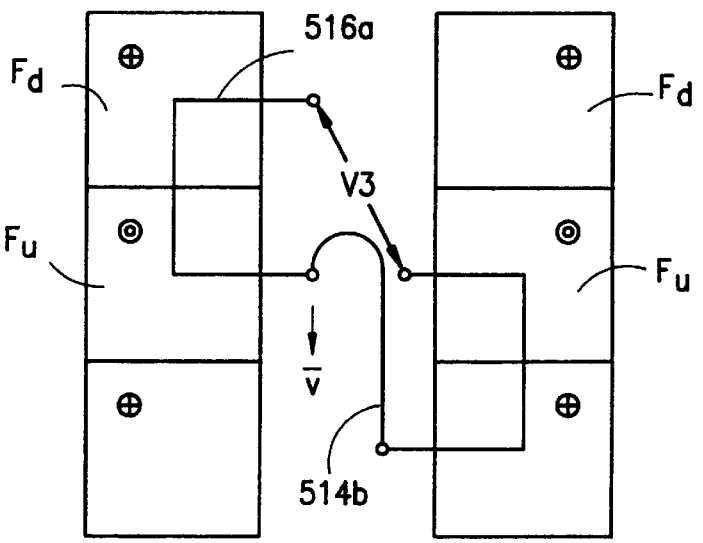
Figure 34:
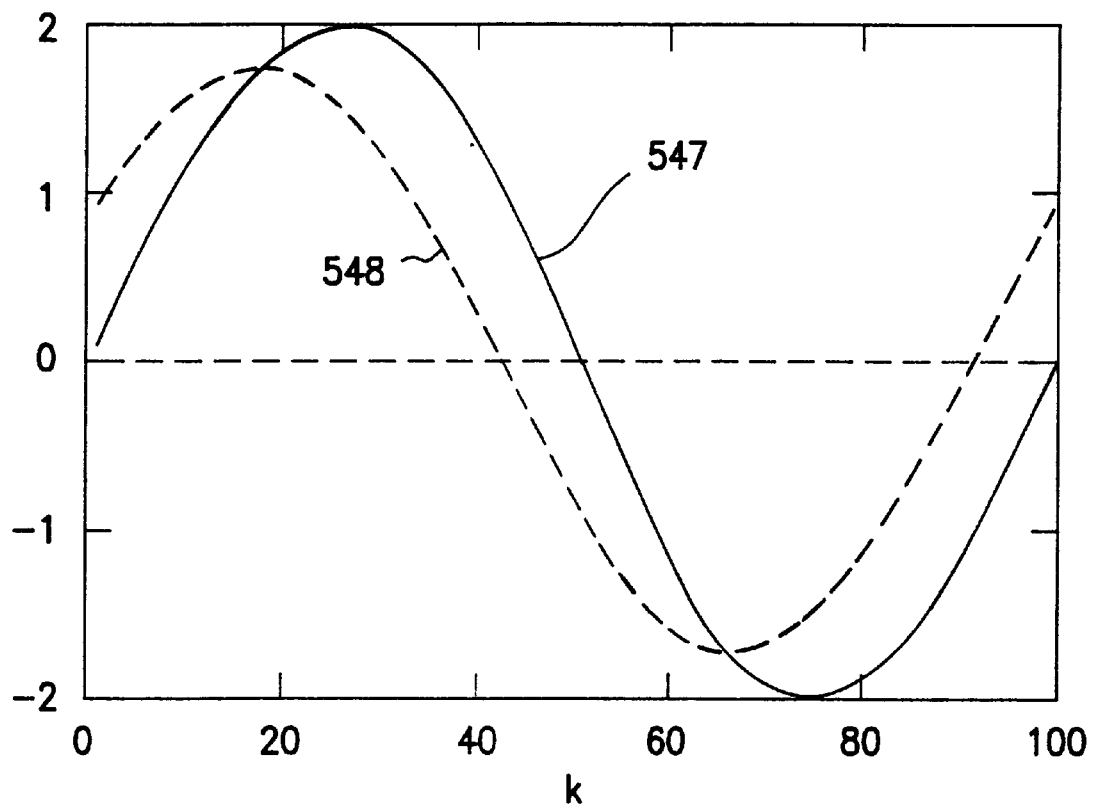
FIG. 34 shows waveforms which are produced by the apparatus of FIG. 28.

FIGS. 33a, 33b and 33c show schematically how the voltages are affected by angularly shifting the coils in the embodiment of FIG. 28. Vector v represents the direction of movement of the magnetic fields. The coils 514a are connected in series to the coils 516a, and these coils are positioned in magnetic fields $F_d$, which go down into the plane of the drawing and magnetic fields $F_u$ which come up from the plane of the drawing.

The coils 514a and 516a actually overlap and are located in the same magnetic fields, but for illustrative purposes, FIGS. 33a, 33b and 33c show the coils in side-by-side relation, and the ring of magnetic fields is shown twice.

When the actuator 520 is angularly adjusted so that the coils are in phase with each other as shown in FIG. 33a, full output voltage is produced at the terminals. This waveform is shown at 547 in FIG. 34. When the coil 514a is one-third a magnet length out of phase with the coil 516a, as shown in FIG. 33b, the waveform will be as shown at curve 548 in FIG. 34. Finally, if the coils are shifted by one magnet length, as shown in FIG. 33c, the voltage induced in the coils will be equal and opposite, the apparatus will be in its null flux condition, and the net voltage will be zero. As a practical matter, the net flux and net voltage in this and the other embodiments is not precisely zero, because an apparatus such as this inherently has imperfections which result in small ripple voltages.

The actuator 504 provides the angular displacement movement which gives the cylinder 514 of the loop assembly an oscillatory motion having a mechanical oscillation frequency which corresponds to the selected and desired final generator output frequency. The rotary motion of the magnet assembly which includes the field magnets 508 and the oscillatory motion of the inner cylinder 514 of the loop assembly provide, at the loop assembly output, a raw amplitude-modulated output signal which has an amplitude which is modulated as a function of the angular displacement of the loop assembly and a induced current frequency which is higher than the mechanical oscillation frequency and is a function of the rotary motion.

A signal processor such as those shown and described in connection with FIGS. 8, 10 or 12 converts the raw output signal to an alternating current signal which has the mechanical oscillation frequency. Preferably, the induced current frequency is at least about ten times the mechanical oscillation frequency.

The Seventh Embodiment

The embodiment of FIGS. 35–38 includes a flywheel 602 which is supported by bearings 604 and 605 for rotation about a vertical axis. In this apparatus, there are generator sections 606 and 608 above and below the flywheel. The actuator includes a motor 610 which is mounted above the flywheel and is arranged to change the phasing between the two sets of generator output coils.

Figure 39:
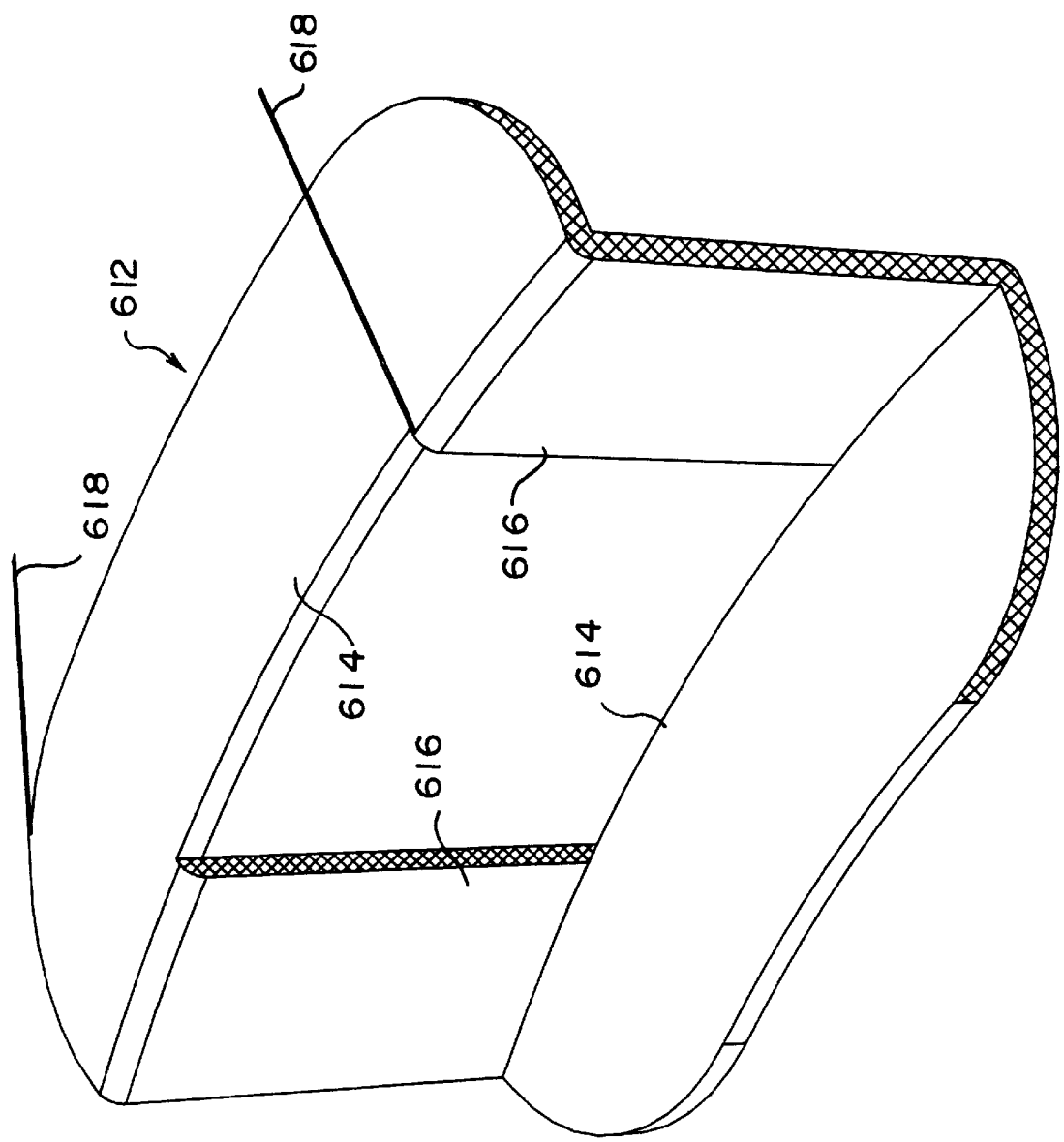
FIG. 39 is a perspective view of a preferred form of coil which is used in the apparatus of FIG. 35.

FIG. 39 shows one of the coils 612 used in the apparatus. This coil has two legs 614 which extend circumferentially in the apparatus, two legs 616 which extend axially in the apparatus, and electrical leads 618 which extend from this coil. The coil is z-shaped so that in the apparatus the circumferential legs will be horizontal and the axial legs will be vertical. The shape of these coils facilitates their installation in an overlapping condition as shown in FIG. 35.

The unit has a main housing 620 which includes a cylindrical body 622, an externally convex upper end cap 624, and an externally convex lower end cap 626 which rests on a base ring 628. The flywheel bearings 604 and 605 are mounted on structural spiders 630 and 631 which are fixed to the housing cylinder 622. The flywheel 602 carries all of the magnets. It has two cylindrical outer back irons 632, 633 and two cylindrical inner back irons 634, 636. Inwardly facing rings of magnets 638 and 639 are located on the outer back irons. In each ring, the magnet poles alternate circumferentially. The magnet poles face toward the axial legs of the stationary z-coils. Supplemental inner back iron rings 640, 641 are attached to the inner rings 634 and 636 to provide a return path for the magnetic flux of the magnets.

The generator output coils 612b in the lower generator section 608 are fixed to the lower support disk 631 and they are connected together in series or in parallel. The generator output coils 612a in the upper generator section 606 are also connected together in series or in parallel and they are fixed to an angularly adjustable disk 642 which has gear teeth on its periphery. The coils 612a are connected in series with the coils 612b, so their relationship is similar to that of coils 514a and 516a in FIGS. 33a, 33b and 33c. The internal edge of the disk 642 is mounted on a nonrotating hub 644.

The actuator in this embodiment is a motor 610 which is mounted on the cylinder 622. It has a drive gear 646 which engages the external teeth on disk 642. Motor 610 is selectively actuated to rotate the disk 642 by a relatively small angle, ten degrees for example. This provides adjustments in the angular positions of the upper generator coils 612a and, accordingly, it changes the phasing between the electrical outputs of the upper and lower sets of generator output coils. In the latter respect, the apparatus of FIG. 35 operates similarly to the apparatus in FIG. 28.

According to the present invention, the motor 610 gives the coils 612a an angular oscillatory motion. It is envisioned that the motor 610 can, additionally or alternatively, move the coils 612a in a nonoscillatory manner, responsive to the deceleration of the flywheel, to maintain a constant output voltage as the flywheel decelerates.

The flywheel 602 is driven by energizing the coils 612a and 612b so that the currents therein will produce Lorentz forces which increase and/or maintain the rotational velocity of the flywheel.

In an alternative embodiment which is not illustrated, the same coils may act both as generator output coils and actuator coils. Such an embodiment is similar to FIG. 29, but it does not have the actuator coils 522 and actuator magnet rings 534. The coils 514a on inner cylinder 514 are connected to a circuit which controls the current in these coils using a load, a switch or other suitable means. The current in the coils 514a will, in the fields produced by the field magnets 508, produce circumferentially directed Lorentz forces which angularly displace the coils 514a on the inner cylinder 514 relative to the coils 516a on the outer cylinder 516. The blades 524 which support the inner cylinder 514 provide resilient forces which oppose the Lorentz forces and bias the inner cylinder 514 angularly toward its null position. Thus, when there is no current in the coils 514a, the cylinder 514 will move back toward its null position.

The coils and loops disclosed in this specification preferably have nonmagnetic cores, as distinguished from coils or loops which have ferrous cores. The disclosed coils and loops have central openings, but it is possible to form them so that their cores are completely filled with loop windings. The cylinders or disks that carry the coils are made of nonmagnetic materials such as fiberglass composites which are not electrically conductive. Preferably the loops are formed by coiling substantial lengths of conductive wire. The field magnets can be permanent magnets or electromagnets.

The generator may be driven by electric motors, hydraulic motors, gas turbine engines, piston engines, flywheels, or other inertial devices, and mechanical mechanisms. The displacement path of the loop assembly preferably includes and extends to opposite sides of the null flux position, but movement to the null flux position is not essential to the invention.

The generators described in this specification have a single phase output, but the invention is equally applicable to three phase generators. For example, the embodiment of FIGS. 35–38 can be modified to provide a three phase output by providing three upper rings of coils 612a and three lower rings of coils 612b. The coils in each upper ring of coils are offset angularly from the coils in other upper rings in order to provide appropriate timing differentials between the three phases in the output of such a generator.

This specification has disclosed only selected embodiments of the invention. Persons familiar with the field of the invention will recognize that the invention may take many other forms other than those disclosed herein. Therefore, it is emphasized that the invention is not limited to the disclosed embodiments but is embracing of modifications and variations thereof which fall within the spirit of the accompanying claims.

I claim:

1. An electrical generator for providing alternating current which has a selected frequency comprising:

a loop assembly and a magnet assembly, one of which is rotatable relative to the other said assembly;

said magnet assembly provided with at least one ring of field magnets which are arranged to provide a circular array of magnetic fields which vary in magnitude from one circumferential position to another and wherein each of said field magnets is selected from the group consisting of permanent magnets and electromagnets;

said loop assembly provided with at least one ring of electrically conductive output loops which are in said magnetic fields and occupy different circumferential positions on the loop assembly, at least a portion of said loop assembly being movable along a displacement path in said magnetic fields to change the position of said output loops with respect to said magnetic fields independently of the relative rotation between said magnet assembly and said loop assembly;

actuator means for providing displacement movement which gives said loop assembly an oscillatory motion having a mechanical oscillation frequency along said displacement path, said mechanical oscillation frequency corresponding to said selected frequency, said rotary motion and said oscillatory motion providing in said loop assembly a raw amplitude-modulated output signal having an amplitude which is modulated as a function of the displacement of said loop assembly and a induced current frequency which is a function of the rotary motion, said induced current frequency being higher than said mechanical oscillation frequency;

a signal processor for converting said raw output signal to an alternating current signal which has said mechanical oscillation frequency.

2. An electrical generator according to claim 1 wherein said loops have nonmagnetic cores.

3. An electrical generator according to claim 1 having a drive means for rotating said magnet assembly.

4. An electrical generator according to claim 1 wherein said magnet assembly is rotatably supported and said loop assembly is supported for said displacement movement.

5. An electrical generator according to claim 1 wherein said displacement path includes a null position where said loops are exposed to zero net flux during relative rotation between said magnet assembly and said loop assembly.

6. An electrical generator according to claim 5 wherein said oscillatory movement includes excursions on opposite sides of said null position.

7. An electrical generator according to claim 5 wherein the loop assembly is movable to said null position.

8. An electrical generator according to claim 1 wherein said induced current frequency is at least about ten times said mechanical oscillation frequency.

9. An electrical generator according to claim 1 wherein said signal processor includes at least four diodes.

10. An electrical generator according to claim 1 wherein said signal processor includes at least four thyristors.

11. An electrical generator according to claim 1 wherein the signal processor includes a bridge formed of semiconductor switches.

12. An electrical generator according to claim 11 wherein said switches comprise at least four thyristors.

13. An electrical generator according to claim 11 wherein said switches comprise at least four diodes.

14. An electrical generator according to claim 11 wherein the state of the bridge is changed when the raw generator output signal has a zero voltage crossing to convert the raw output signal to an alternating current signal which has said mechanical oscillation frequency.

15. An electrical generator according to claim 11 wherein the signal processor includes a capacitor which smooths the bridge output to provide said alternating current signal which is substantially a sine wave.

16. An electrical generator according to claim 11 wherein the signal processor includes a inductor which smooths the bridge output to provide said alternating current signal which is substantially a sine wave.

17. An electrical generator according to claim 1 wherein the signal processor includes a full wave rectifier for providing a signal which has identical adjacent half-waves, and an inverter circuit for reversing alternate half-waves to provide an alternating current output signal.

18. An electrical generator according to claim 11 wherein the signal processor includes a full wave rectifier which produces at its output a signal in the form of a sine wave which does not cross an axis which represents zero voltage, a transformer which has primary windings connected to the output of said rectifier, said transformer having secondary windings which provide said alternating current signal which has said mechanical oscillation frequency.

19. An electrical generator according to claim 1 wherein the magnet assembly has a first ring of field magnets and a second ring of field magnets, said first and second rings being concentric and being axially offset from each other, said loop assembly having loops which each lie in the magnetic fields of both rings of field magnets, said displacement movement being in an axial direction to vary the proportion of each loop which is exposed to the magnetic fields of the first ring and the magnetic fields of the second ring.

20. An electrical generator according to claim 19 wherein the actuator means includes at least one ring of actuator loops which lie in said magnetic fields of said magnet assembly.

21. An electrical generator according to claim 19 wherein the actuator means includes a first ring of actuator loops which lie in the magnetic fields of said first ring of field magnets, and a second ring of actuator loops which lie in the magnetic fields of the second ring of field magnets, said first and second rings of actuator loops being fixed with respect to said loop assembly so that a current induced in said actuator loops by a said magnetic field produces Lorentz forces which move said loop assembly axially.

22. An electrical generator according to claim 19 wherein the actuator means includes a ring of actuator loops which lie in the magnetic fields of both the first ring of magnets and the second ring of magnets, said ring of actuator loops being fixed with respect to said loop assembly so that current flowing in said actuator loops produces Lorentz forces which move said loop assembly axially.

23. An electrical generator according to claim 22 wherein a said ring of output loops and a said ring of said actuator loops have a same diameter and form an output/actuator ring in which said actuator loops are located between said output loops.

24. An electrical generator according to claim 23 having two of said output/actuator rings which both lie in the magnetic fields of the first and second rings of magnets.

25. A generator according to claim 1 wherein the magnet assembly includes a first ring of field magnets, and a second ring of field magnets which is axially spaced from said first ring of field magnets, said loop assembly having a first ring of loops and a second ring of loops, said first ring of loops lying in the magnetic fields of the first ring of field magnets, said second ring of loops lying in the magnetic fields of the second ring of field magnets, said loops of the first ring being electrically connected to the loops of the second ring to provide said raw output signal.

26. An electrical generator according to claim 1 wherein the loop assembly has a first ring of loops and a second ring of loops, said first and second rings of loops being concentric, said displacement movement being an angular movement of said first ring of loops which varies the relative angular position between the loops of the first ring and the loops of the second ring, said loops of the first ring being electrically connected to the loops of the second ring to provide said raw output signal.

27. An electrical generator according to claim 26 wherein the first and second rings overlap so as to be simultaneously exposed to said magnetic fields.

28. An electrical generator according to claim 26 wherein there is a first said ring of field magnets which provide magnetic fields to said first ring of loops, and a second said ring of field magnets which provide magnetic fields to said second ring of loops.

29. An electrical generator according to claim 1 wherein the field magnets each have a polarity which is opposite to that of an adjacent field magnet, whereby adjacent magnetic fields are oppositely directed.

30. An electrical generator according to claim 29 wherein said adjacent field magnet is a circumferentially adjacent field magnet.

31. An electrical generator according to claim 29 wherein said adjacent field magnet is an axially adjacent field magnet.

32. An electrical generator according to claim 29 wherein said adjacent field magnet is a radially adjacent field magnet.

33. An electrical generator according to claim 1 wherein one of said assemblies is rotatable about an axis of rotation, said generator having, in said magnetic fields, a body which is capable of being attracted by a magnet, said body being spaced from said field magnets to define a gap which lies between the field magnets and the body, said output loops being located in said gap.

34. An electrical generator according to claim 33 wherein said gap has a thickness which is less than one-fifth the distance between the axis of rotation and the center of an output loop which is in said gap.

35. An electrical generator according to claim 33 wherein said output loops have nonmagnetic cores.

36. An electrical generator according to claim 1 wherein the actuator means includes at least one actuator loop which lies in one or more magnetic fields, said generator having means for controlling the flow of current in said actuator loop to control Lorentz forces which move the loop assembly in said displacement path.

37. An electrical generator according to claim 1 wherein there is a first ring of said field magnets and a second ring of said field magnets, said second ring of field magnets being axially offset with respect to said first ring of field magnets, said field magnets being positioned to provide radially directed magnetic fields, said displacement path being an axial displacement path which changes the positions of the output loops to increase the exposure of the output loops to the magnetic fields from said first ring of field magnets and to decrease the exposure of the output loops to said second ring of field magnets.

38. An electrical generator according to claim 1 wherein said field magnets are positioned to provide axially directed magnetic fields, said generator having a first ring of said field magnets and a second ring of said field magnets, said first ring of said field magnets being radially spaced from said second ring of said field magnets, each of said output loops being in said magnetic fields from both of said rings of field magnets, said displacement path being a radial displacement path which changes the positions of the output loops to increase the exposure of one said output loop to the magnetic fields from the first ring of field magnets and decrease the exposure of said one output loop to the magnetic fields from the second ring of field magnets.

39. An electrical generator according to claim 1 wherein there is a first ring of output loops and a second ring of output loops, said first and second rings of output loops being located in magnetic fields emanating from one said ring of field magnets, said displacement movement being an angular movement of the first ring of output loops relative to the second ring of output loops to change the positions of said output loops relative to the magnetic fields and provide a difference in phasing between voltages induced in the first and second rings of output loops.

40. An electrical generator according to claim 1 wherein the actuator means includes an electrical conductor located in a magnetic field, and means for providing a flow of electrical current in said conductor to produce Lorentz forces which move the loop assembly in said displacement path.

41. An electrical generator according to claim 1 having a plurality of flexible members which support and guide said loop assembly, each of said flexible members having a stationary portion and a movable portion, said movable portions being fixed relative to said loop assembly and being movable parallel to said displacement path.

42. An electrical generator according to claim 41 wherein said flexible members are resilient and are operable to bias said loop assembly to a given position.

43. An electrical generator according to claim 41 wherein said flexible members are diaphragms which are spaced axially from each other to support and guide said loop assembly for movement in an axial direction.

44. An electrical generator according to claim 43 wherein said diaphragms are parallel to each other.

45. An electrical generator according to claim 41 wherein the flexible members have their movable portions spaced axially from their stationary portions to support said loop assembly for angular movement, said flexible members being circumferentially spaced from each other.

46. An electrical generator according to claim 45 wherein said flexible members are inflexible in a radial direction and flexible in a circumferential direction.

47. An electrical generator for providing alternating current which has a selected frequency comprising:

a loop assembly and a magnet assembly, one of which is rotatable relative to the other said assembly about an axis of rotation;

said magnet assembly provided with at least one ring of field magnets which are arranged to provide a circular array of magnetic fields which vary in magnitude from one circumferential position to another said loop assembly provided with at least one ring of electrically conductive output loops which are in said magnetic fields and occupy different circumferential positions on the loop assembly, at least a portion of said loop assembly being movable along a displacement path in said magnetic fields to change the position of said output loops with respect to said magnetic fields independently of the relative rotation between said magnet assembly and said loop assembly;

each of said field magnets is selected from the group consisting of permanent magnets and electromagnets;

actuator means for providing displacement movement which gives said loop assembly an oscillatory motion having a mechanical oscillation frequency along said displacement path, said mechanical oscillation frequency corresponding to said selected frequency, said rotary motion and said oscillatory motion providing in said loop assembly a raw amplitude-modulated output signal having an amplitude which is modulated as a function of the displacement of said loop assembly and a induced current frequency which is a function of the rotary motion, said induced current frequency being higher than said mechanical oscillation frequency;

said actuator means including an electrical conductor located in a magnetic field, and means for providing a flow of electrical current in said electrical conductor to produce Lorentz forces which move the loop assembly in said displacement path;

a signal processor for converting said raw output signal to an alternating current signal which has said mechanical oscillation frequency.

48. An electrical generator according to claim 47 wherein said magnet assembly is rotatably supported and said loop assembly is supported for said displacement movement.

49. An electrical generator according to claim 47 wherein said electrical conductor is located in a magnetic field which extends in a radial direction, and the electrical conductor is a loop which is spaced from the axis of rotation.

50. An electrical generator according to claim 47 wherein said electrical conductor is located in a magnetic field which extends in an axial direction, and the electrical conductor is a loop which is spaced from the axis of rotation.

51. An electrical generator according to claim 47 wherein the electrical conductor is a loop which is concentric with the axis of rotation.

52. An electrical generator for providing alternating current which has a selected frequency comprising:

a loop assembly and a magnet assembly, one of which is rotatable relative to the other said assembly;

said magnet assembly provided with at least one ring of field magnets which are arranged to provide a circular array of magnetic fields which vary in magnitude from one circumferential position to another and wherein each of said field magnets is selected from the group consisting of permanent magnets and electromagnets;

said loop assembly provided with at least one ring of electrically conductive output loops which are in said magnetic fields and occupy different circumferential positions on the loop assembly, at least a portion of said loop assembly being movable along a displacement path in said magnetic fields to change the position of said output loops with respect to said magnetic fields independently of the relative rotation between said magnet assembly and said loop assembly;

actuator means for providing displacement movement which gives said loop assembly an oscillatory motion having a mechanical oscillation frequency along said displacement path, said mechanical oscillation frequency corresponding to said selected frequency, said rotary motion and said oscillatory motion providing in said loop assembly a raw amplitude-modulated output signal having an amplitude which is modulated as a function of the displacement of said loop assembly and a induced current frequency which is a function of the rotary motion, said induced current frequency which is a function of the rotary motion, said induced current frequency being higher than said mechanical oscillation frequency;

a plurality of flexible members which support and guide said loop assembly, each of said flexible members having a stationary portion and a movable portion, said movable portions being fixed relative to said loop assembly and being movable parallel to said displacement path;

a signal processor for converting said raw output signal to an alternating current signal which has said mechanical oscillation frequency.

53. An electrical generator according to claim 52 wherein said magnet assembly is rotatably supported and said loop assembly is supported for said displacement movement.

54. An electrical generator according to claim 52 wherein said flexible members are resilient and are operable to bias said loop assembly to a given position.

55. An electrical generator according to claim 52 wherein said flexible members are diaphragms which are spaced axially from each other to support and guide said loop assembly for movement in an axial direction.

56. An electrical generator according to claim 55 wherein said diaphragms are parallel to each other.

57. An electrical generator according to claim 52 wherein the flexible members have their movable portions spaced axially from their stationary portions to support said loop assembly for angular movement, said flexible members being circumferentially spaced from each other.

58. An electrical generator according to claim 57 wherein said flexible members are inflexible in a radial direction and flexible in a circumferential direction.

* * * * *